US012455425B2

(12) United States Patent
Houser et al.

(10) Patent No.: US 12,455,425 B2
(45) Date of Patent: *Oct. 28, 2025

(54) OPTICAL INTERCONNECT SYSTEM FOR AN EQUIPMENT RACK OF A FIBER OPTIC NETWORK AND METHOD OF INSTALLING FIBER OPTIC CABLES IN AN EQUIPMENT RACK USING THE OPTICAL INTERCONNECT SYSTEM

(71) Applicant: CORNING RESEARCH & DEVELOPMENT CORPORATION, Corning, NY (US)

(72) Inventors: Christopher Shawn Houser, Hickory, NC (US); Francisco Luna Pina, Hickory, NC (US); Joshua Thomas Smith, Mooresville, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 272 days.

This patent is subject to a terminal disclaimer.

(21) Appl. No.: 18/208,231

(22) Filed: Jun. 9, 2023

(65) Prior Publication Data

US 2023/0400654 A1    Dec. 14, 2023

Related U.S. Application Data

(60) Provisional application No. 63/351,007, filed on Jun. 10, 2022.

(51) Int. Cl.
G02B 6/00    (2006.01)
G02B 6/44    (2006.01)
H05K 7/14   (2006.01)

(52) U.S. Cl.
CPC .......... *G02B 6/4446* (2013.01); *G02B 6/4452* (2013.01); *G02B 6/4471* (2013.01); *H05K 7/1497* (2013.01)

(58) Field of Classification Search
CPC .. G02B 6/4446; G02B 6/4452; G02B 6/4471; G02B 6/44715; G02B 6/00; H05K 7/1497
See application file for complete search history.

(56) References Cited

U.S. PATENT DOCUMENTS 7,166,805 B2    1/2007  Robinson et al.
7,352,948 B2    4/2008  Beck
(Continued)

FOREIGN PATENT DOCUMENTS

EP    2221932 A1    8/2010
JP    2021-170082 A    10/2021

*Primary Examiner* — Jennifer Doan
(74) *Attorney, Agent, or Firm* — Adam R. Weeks

(57) ABSTRACT

An optical interconnect system for installing fiber optic cables in an equipment rack having an equipment patch panel with a plurality of coupling port locations is disclosed. The optical interconnect system includes a plurality of cable harnesses configured for installation in the equipment rack and at least one installation tray having a plurality of coupling locations. The plurality of coupling locations receives a connector from the plurality of cable harnesses. The plurality of coupling locations on the installation tray has an arrangement that corresponds to the plurality of port locations on the at least one equipment patch panel, thereby allowing a technician to visually realize that a patching error has occurred during the installation. A method of installing fiber optic cables in an equipment rack using the optical interconnect system is also disclosed.

20 Claims, 15 Drawing Sheets

(56) References Cited

U.S. PATENT DOCUMENTS

| | | | |
|---|---|---|---|
| 7,697,811 B2 | 4/2010 | Murano et al. | |
| 7,974,105 B2 | 7/2011 | Dean et al. | |
| 8,135,257 B2 | 3/2012 | Cooke et al. | |
| 8,559,786 B2 | 10/2013 | Ciechomski et al. | |
| 8,731,364 B2* | 5/2014 | Murano | G02B 6/4471 |
| | | | 385/136 |
| 8,737,797 B2 | 5/2014 | Kubinski et al. | |
| 8,867,883 B2 | 10/2014 | Crain et al. | |
| 9,140,871 B2 | 9/2015 | Milne et al. | |
| 9,229,187 B2* | 1/2016 | Cooke | G02B 6/44715 |
| 9,977,193 B2 | 5/2018 | Abe et al. | |
| 10,261,279 B1 | 4/2019 | Potter et al. | |
| 10,345,538 B2 | 7/2019 | Hangebrauck et al. | |
| 2010/0215330 A1 | 8/2010 | Sokolowski et al. | |
| 2024/0402450 A1* | 12/2024 | Smith | G02B 6/44528 |

* cited by examiner

OPTICAL INTERCONNECT SYSTEM FOR AN EQUIPMENT RACK OF A FIBER OPTIC NETWORK AND METHOD OF INSTALLING FIBER OPTIC CABLES IN AN EQUIPMENT RACK USING THE OPTICAL INTERCONNECT SYSTEM

CROSS-REFERENCE TO RELATED APPLICATION

This application claims the benefit of priority of U.S. Provisional Application No. 63/351,007, filed on Jun. 10, 2022, the content of which is relied upon and incorporated herein by reference in its entirety.

TECHNICAL FIELD

This disclosure relates generally to fiber optic connectivity, and more particularly to an optical interconnect system for installing fiber optic cables in equipment racks of a fiber optic network. The disclosure also relates to a method of installing fiber optic cables in an equipment rack using the optical interconnect system.

BACKGROUND

The large amount of data and other information transmitted over the internet has led businesses and other organizations to develop large scale data centers for organizing, processing, storing and/or disseminating large amounts of data. Data centers contain a wide range of network equipment including, for example, servers, networking switches, routers, storage subsystems, etc. Data centers further include a large amount of cabling and equipment racks to organize and interconnect the network equipment in the data center. Modern data centers may include multi-building campuses having, for example, one primary or main building and a number of auxiliary buildings in close proximity to the main building. All the buildings on the campus are interconnected by a local fiber optic network.

Data center design and cabling-infrastructure architecture are increasingly large and complex. To manage the interconnectivity of a data center, the network equipment within the buildings on the data center campus is often arranged in structured data halls having a large number of spaced-apart rows. Each of the rows is, in turn, configured to receive a number of equipment racks or cabinets (e.g., twenty racks or cabinets) which hold the network equipment. In some data center architectures, each of the rows includes a main patch panel at a front or head end of the row. Distribution cables with a relatively large number of optical fibers (high fiber counts) are routed from a building distribution frame (sometimes referred to as a main distribution frame) to the main patch panels (sometimes part of cabinets or equipment referred to as an intermediate distribution frame) for the different rows of equipment racks. At the main patch panels, a large number of distribution fiber optic cables with lower fiber counts are connected to the optical fibers of the associated high fiber count distribution cable(s) and routed along the row to connect to the network equipment held in the various racks in the row. To organize the large number of in-row distribution fiber optic cables, each row typically includes a cable tray or basket disposed above the row for supporting the distribution fiber optic cables as they extend along the row. The network equipment in the racks is optically connected to the distribution fiber optic cables by technicians during the construction of the data center using a large number of cables.

Recent equipment rack architectures include a main rack patch panel near the top of the equipment rack (sometimes referred to as a "top of rack" switch) and a number of equipment patch panels (e.g., five, six or more, sometimes referred to as "switches") vertically arranged in the rack generally below the main rack patch panel. Each of the equipment patch panels holds network equipment which is to be optically connected to the distribution fiber optic cables extending along the row in the overhead cable trays. To achieve this connection, distribution fiber optic cables are routed to, for example, a rear of the main rack patch panel. The network equipment in the multiple vertically arranged equipment patch panels is then connected to the front of the main rack patch panel via separate fiber optic cables.

For example, each of the equipment patch panels has a plurality of panel openings in a particular configuration for receiving network equipment. The network equipment, in turn, includes a plurality of connector ports corresponding to the panel openings in the equipment patch panel. The connector ports on the network equipment are configured to receive connectors associated with the fiber optic cables. The fiber optic cables are installed between the main rack patch panel and the equipment patch panels according to a pre-determined cable-routing architecture or scheme to ensure that information (via the optical signals transmitted through the fiber optic cables) is being routed to the proper network equipment. Due to the large number of optical connections being made in the equipment rack, which may be on the order of a few thousand, the routing of cables in the rack can often be chaotic, time consuming, and prone to error. For example, a patching error of the fiber optic cable between the main rack patch panel and an assigned connector port associated with an equipment patch panel according to the cable-routing scheme does sometimes occur in data center construction. Should a patching error occur between the main rack patch panel and the assigned connector port(s) associated with the equipment patch panels, there will be a miscommunication in the optical signals through the fiber optic network. Technicians will then have to troubleshoot the cable routing and connectivity in the equipment racks to identify the patching error. As can be appreciated, this is a time-consuming endeavor that is expensive and can be a source of delay in data center construction.

Accordingly, manufacturers continually strive to improve the interconnectivity within an equipment rack to better organize the fiber optic cables in the equipment rack and to make optical connections in a manner that minimizes patching errors. It is believed that by providing equipment racks with enhanced cable and patching management, labor, installation time, and related costs associated with data center construction will be decreased.

SUMMARY

In one aspect of the disclosure, an optical interconnect system for installing fiber optic cables in an equipment rack of a fiber optic network is disclosed. The equipment rack includes at least one equipment patch panel having a plurality of coupling port locations for connecting the network equipment associated with the at least one patch panel to the fiber optic network. The optical interconnect system includes a plurality of cable harnesses configured for installation in the equipment rack. Each of the plurality of cable harnesses includes a fiber optic cable, a furcation housing, and a plurality of breakout legs. The fiber optic cable carries a plurality of optical fibers and includes a network end and a furcation end. The network end includes at least one primary fiber optic connector terminating the plurality of optical fibers and is configured to be connected to the fiber optic network. The furcation housing includes a cable end receiving the furcation end of the fiber optic cable and a breakout end. The plurality of breakout legs includes a furcation end and a rack end, and each of the plurality of breakout legs is configured to carry at least one optical fiber of the plurality of optical fibers. The furcation end of each of the plurality of breakout legs is received in the breakout end of the furcation housing, and the rack end of each of the plurality of breakout legs is terminated by at least one secondary fiber optic connector. The optical interconnect system further includes at least one installation tray having a plurality of coupling locations. Each of the plurality of secondary fiber optic connectors from the plurality of breakout legs is connected to the at least one installation tray at a respective coupling location of the plurality of coupling locations. The plurality of coupling locations on the at least one installation tray has an arrangement that corresponds to the plurality of port locations on the at least one equipment patch panel. The correspondence in the plurality of coupling locations on the at least one installation tray and the plurality of port locations on the at least one equipment patch panel allows a technician to readily identify a patching error during installation of the plurality of cable harnesses in the equipment rack.

In one embodiment, the plurality of coupling locations on the at least one installation tray may be arranged in a first pattern, the plurality of port locations on the at least one equipment patch panel may be arranged in a second pattern, and the first pattern may correspond to the second pattern. For example, the first pattern of the plurality of coupling locations may define a m×n array of rows and columns, respectively, and the second pattern of the plurality of port locations may also define a corresponding m×n array of rows and columns. In one embodiment, for example, each of the arrays may have six rows and sixteen columns.

In one embodiment, the at least one installation tray may include a connector panel at which the plurality of secondary fiber optic connectors is connected. Each of the plurality of coupling locations may be defined by a recess in the connector panel, and each of the plurality of secondary fiber optic connectors may be received in a recess of the plurality of recesses in the at least one installation tray. In one embodiment, each of the plurality of secondary fiber optic connectors may project from its respective recess in the at least one installation tray at an acute angle relative to the connector panel of the installation tray. For example, the angle may preferably be between about thirty degrees and about sixty degrees. The angle may be even more preferably at about forty-five degrees.

In one embodiment, the at least one installation tray of the optical interconnect system may include a plurality of installation trays. Each installation tray may correspond to a select one of the plurality of equipment patch panels in the equipment rack. In one embodiment, for example, the optical interconnect system may include no more than three installation trays. In another embodiment, however, the number of installation trays in the optical interconnect system may correspond to the total number of equipment patch panels in the equipment rack (e.g., six installation trays).

In one embodiment, the optical interconnect system may include a cable management device including a cover for surrounding at least a portion of a length of the plurality of cable harnesses of the optical interconnect system. This allows the plurality of cable harnesses of the optical interconnect system to be handled in an easier manner by a technician or the like during installation. In one embodiment, the cover may surround at least a portion of the length of the plurality of cable harnesses between the primary fiber optic connector and the furcation housing of each of the plurality of cable harnesses. Thus, the portion of the optical interconnect system between the primary fiber optic connectors and the furcation housings may be handled as a unit.

In another embodiment, the optical interconnect system may include a furcation management device configured to be connected to the equipment rack. In one embodiment, for example, the furcation management device may include at least one furcation bracket holding a plurality of furcation housings from the plurality of cable harnesses to at least partially manage the cable harnesses in the equipment rack. In one embodiment, the at least one furcation bracket may include a main portion and a mounting portion. The main portion defines a plurality of furcation bays, where each of the furcation bays has a furcation housing of the plurality of furcation housings positioned therein. The mounting portion connects the at least one furcation bracket to the equipment rack, such as to one or more support arms thereof.

In one embodiment, the main portion includes an elongate body defining a face and a plurality of tabs extending from the face of the elongate body. Each of the plurality of furcation bays is formed by an adjacent pair of the plurality of tabs. In one embodiment, each of the plurality of tabs extending from the elongate body forms an acute angle relative to the face. This may prevent inadvertent dislodgement of the furcation housings from the at least one furcation bracket. In one embodiment, the mounting portion may include a closed loop or a hook arm for connecting the furcation bracket to the equipment rack.

In another embodiment, the optical interconnect system may include a bracket system including a furcation bracket and optionally a leg bracket. The furcation bracket includes a plurality of elongate furcation slots configured to receive a plurality of furcation housings therein. In one embodiment, the furcation bracket includes a base wall and a plurality of elongate fingers extending from the base wall, where each of the plurality of elongate furcation slots is formed by an adjacent pair of the plurality of elongate fingers. In one embodiment, the optional leg bracket may include a plurality of leg slots for receiving a plurality of breakout legs of the plurality of cable harnesses. In one embodiment, the leg bracket may include a base wall and a plurality of elongate fingers extending from the base wall, where each of the plurality of elongate leg slots is formed by an adjacent pair of the plurality of elongate fingers.

In another aspect of the disclosure, a method of installing a plurality of cable harness in an equipment rack of a fiber optic network is disclosed. The equipment rack includes a plurality of equipment patch panels, where each equipment patch panel includes a plurality of coupling locations defined by connector ports of network equipment. The method includes: i) providing at least one optical interconnect system according to the aspect described above; ii) positioning the plurality of cable harnesses of the at least one optical interconnect system relative to the equipment rack; iii) positioning the at least one installation tray of the at least one optical interconnect system relative to a selected one of the plurality of equipment patch panels in the equipment rack; and iv) transferring each of the plurality of secondary fiber optic connectors from the at least one installation tray to a connector port of the plurality of connector ports associated with the selected one of the plurality of equipment patch panels.

In one embodiment, positioning the plurality of cable harnesses relative to the equipment rack may include connecting the plurality of cable harnesses to the equipment rack so that the primary fiber optic connectors from the plurality of cable harnesses are adjacent a main rack patch panel in the equipment rack and the at least one installation tray is adjacent the selected one of the plurality of equipment patch panels. In one embodiment, the equipment rack may include at least one furcation management device connected thereto, and positioning the plurality of cable harnesses relative to the equipment rack may include connecting the furcation housings from the plurality of cable harnesses to the at least one furcation management device connected to the equipment rack. In an alternative embodiment, however, the at least one optical interconnect system may include the furcation management device, and positioning the plurality of cable harnesses relative to the equipment rack may include connecting the at least one furcation management device to the equipment rack.

In one embodiment, positioning the at least one installation tray may include positioning the at least one installation tray below the selected one of the plurality of equipment patch panels so as to extend away from the selected one of the plurality of equipment patch panels. In one embodiment, the at least one installation tray may be positioned such that the at least one installation tray extends away from the selected one of the plurality of equipment patch panels in a substantially perpendicular manner. In another embodiment, the method may further include temporarily connecting the at least one installation tray to the equipment rack. In this embodiment, the technician does not have to hold the at least one installation tray as the transfer of the secondary fiber optic connector from the at least one installation tray to the selected equipment patch panel is being conducted.

In one embodiment, transferring each of the plurality of secondary fiber optic connectors may include transferring each of the plurality of secondary fiber optic connectors one at a time. In one embodiment, the plurality of coupling locations on the at least one installation tray and the plurality of port locations on the selected one of the plurality of equipment patch panels may each be arranged in an array having a plurality of rows and a plurality of columns. In one embodiment, transferring each of the plurality of secondary fiber optic connectors may include transferring each of the plurality of secondary fiber optic connectors in a row-by-row manner or in a column-by-column manner. This process may make it even more evident to the technician when a patching error has occurred.

In one embodiment, the method may further include connecting each of the primary fiber optic connectors from the plurality of cable harnesses to respective connector ports in the main rack patch panel of the equipment rack. Thus, the network equipment associated with the at least one equipment patch panels is connected to the fiber optic network.

In one embodiment, the at least one optical interconnect system may include additional installation trays (i.e., more than one installation tray), and the method may include repeating steps ii)-iv) for each of the plurality of installation trays at a respective one of the remaining plurality of equipment patch panels in the equipment rack. In one embodiment, the at least one optical interconnect system may include a plurality of optical interconnect systems each being installed according to the aspect described above. In this embodiment, the technician will install more than one optical interconnect system to fully "wire" the equipment rack.

In a further aspect of the disclosure, an equipment rack of a fiber optic network is disclosed. The equipment rack includes a plurality of equipment patch panels mounted in the equipment rack, where each of the plurality of equipment patch panels includes a plurality of connector ports, and a plurality of cable harnesses arranged in the equipment rack. Each of the plurality of cable harnesses includes a fiber optic cable, a furcation housing, and a plurality of breakout legs. The fiber optic cable carries a plurality of optical fibers and includes a network end and a furcation end. The network end includes at least one primary fiber optic connector terminating the plurality of optical fibers and is configured to be connected to the fiber optic network. The furcation housing includes a cable end receiving the furcation end of the fiber optic cable and a breakout end. The plurality of breakout legs includes a furcation end and a rack end, and each of the plurality of breakout legs is configured to carry at least one optical fiber of the plurality of optical fibers. The furcation end of each of the plurality of breakout legs is received in the breakout end of the furcation housing, and the rack end of each of the plurality of breakout legs is terminated by at least one secondary fiber optic connector. The plurality of secondary fiber optic connectors from the plurality of breakout legs is connected to connector ports in the plurality of equipment patch panels mounted in the equipment rack. The equipment rack further includes at least one furcation management device mounted to the equipment rack and holding the furcation housings from the plurality of cable harnesses.

In one embodiment, the at least one furcation management device may include at least one furcation bracket holding a plurality of furcation housings from the plurality of cable harnesses. In one embodiment, the at least one furcation bracket may include a main portion and a mounting portion. The main portion may define a plurality of furcation bays, where each of the furcation bays has a furcation housing of the plurality of furcation housings positioned therein. The mounting portion connects the furcation bracket to the equipment rack. In one embodiment, the equipment rack may include cable management devices in the form of a plurality of support arms. In this embodiment, the mounting portion may include a closed loop or a hook arm, where the closed loop or hook arm of the at least one furcation bracket receives at least one of the support arms to connect the at least one furcation bracket to the equipment rack.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to an optical interconnect system for installing fiber optic cables in an equipment rack of a fiber optic network in a manner that reduces the likelihood of making patching errors when connecting the fiber optic cables to the equipment rack according to a pre-determined cable-routing scheme. The equipment rack typically includes a main rack patch panel near a top of the equipment rack and a plurality of equipment patch panels having network equipment associated therewith. Each of the equipment patch panels defines a plurality of port locations. The optical interconnect system includes a plurality of fiber optic cables and at least one installation tray that holds the fiber optic connectors associated with the fiber optic cables for connecting with the equipment patch panels in the equipment rack. The installation tray includes a plurality of coupling locations. The plurality of coupling locations on the installation tray has a pattern that generally corresponds to the pattern of the plurality of port locations on a selected one of the equipment patch panels. During installation of the connectors of the fiber optic cables to the equipment patch panels, the installation tray may be arranged relative to the selected equipment patch panel such that a technician may readily see the correspondence in the pattern of the plurality of coupling locations on the installation tray and the pattern of the plurality of port locations on the selected equipment patch panel. In this way, a technician may easily identify when a patching error has occurred during installation of the fiber optic cables.

The description also relates to different cable management devices and/or furcation management devices to aid in organizing the plurality of fiber optic cables being installed in the equipment rack. For example, the optical interconnect system may include a cover that surrounds the plurality of fiber optic cables along at least a portion thereof. Additionally, or alternatively, furcation management devices, such as one or more furcation brackets, may be used to organize and manage the fiber optic cables. The furcation brackets may form part of the optical interconnect system. Alternatively, the furcation brackets may be part of the equipment rack and the furcation housings of the fiber optic cables may be positioned in the furcation brackets as the fiber optic cables are being installed. These and other aspects according to embodiments of the disclosure will now be described in greater detail.

Figure 1:
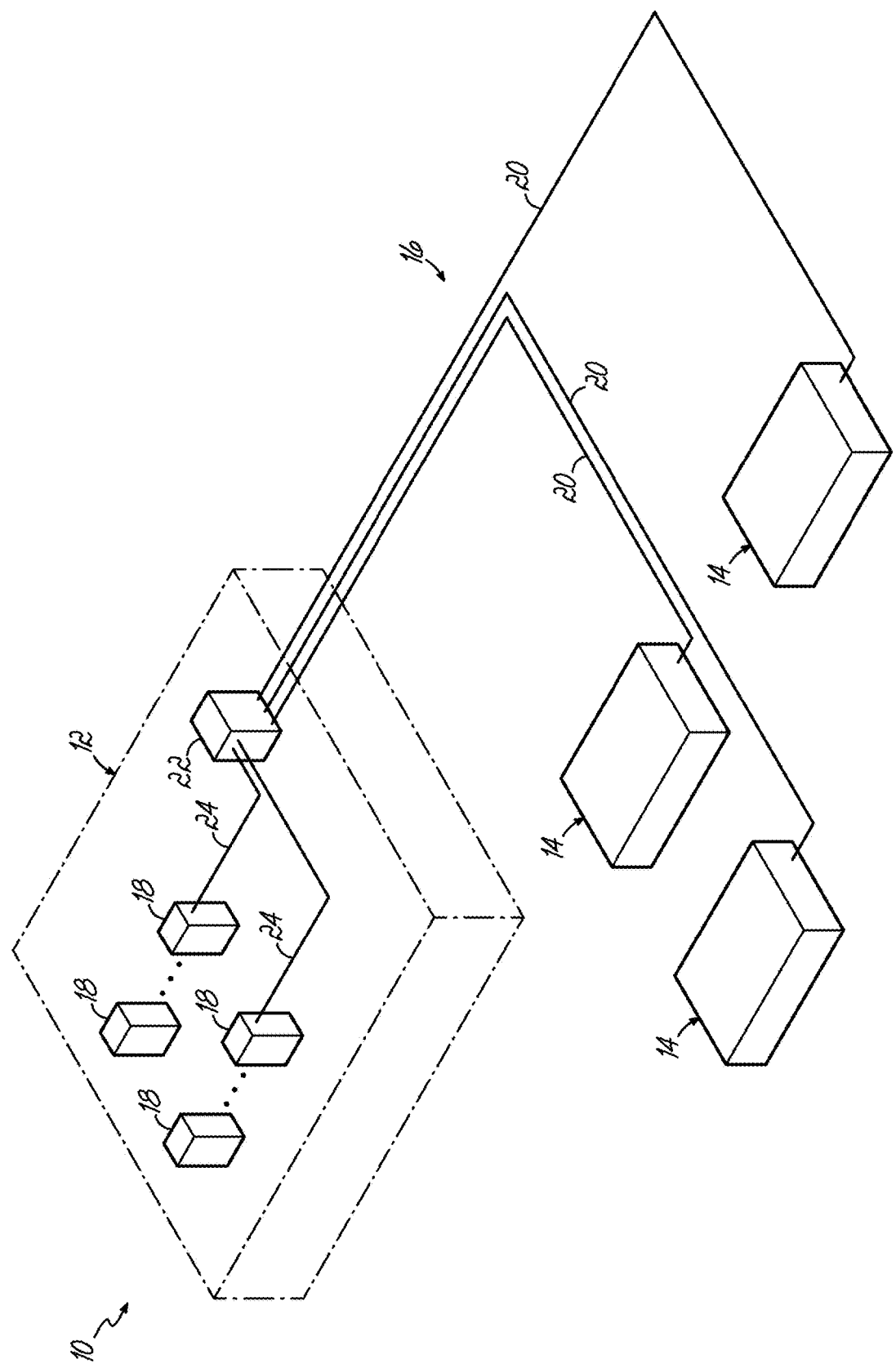
FIG. 1 is a schematic illustration of a data center campus.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows network equipment 18 in the main building 12 to communicate with various network equipment (not shown) in the auxiliary buildings 14. In the exemplary embodiment shown, the local fiber optic network 16 includes trunk cables 20 extending between the main building 12 and each of the auxiliary buildings 14. Conventional trunk cables 20 generally include a high fiber-count arrangement of optical fibers for passing data and other information through the local fiber optic network 16. In the example illustrated in FIG. 1, the trunk cables 20 from the auxiliary buildings 14 are routed to one or more distribution cabinets 22 housed in the main building 12 (one shown).

Within the main building 12, a plurality of indoor fiber optic cables 24 ("indoor cables 24") are routed between the network equipment 18 and the one or more distribution cabinets 22. The indoor cables 24 generally include a high fiber-count arrangement of optical fibers for passing data and other information from the distribution cabinets 22 to the network equipment 18. Although only the interior of the main building 12 is schematically shown in FIG. 1 and discussed above, each of the auxiliary buildings 14 may house similar equipment for similar purposes. Thus, although not shown, each of the trunk cables 20 may be routed to one or more distribution cabinets 22 in one of the auxiliary buildings 14 in a manner similar to that described above. Furthermore, each of the auxiliary buildings 14 may include indoor cables 24 that extend between network equipment 18 and the one or more distribution cabinets 22 of the auxiliary building 14.

Figure 2:
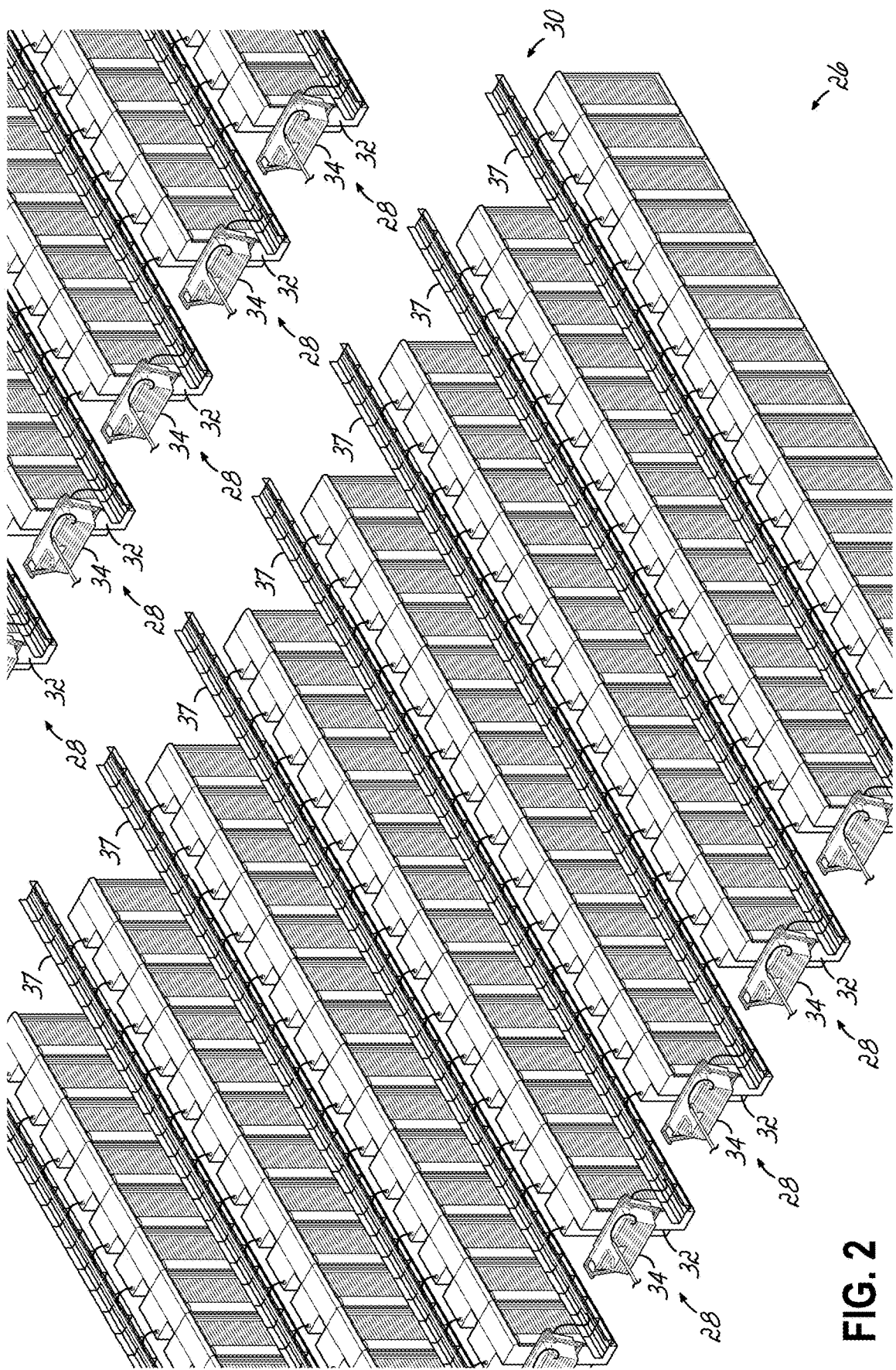
FIGS. 2 and 3 are partial perspective views of an exemplary data hall of the data center shown in FIG. 1.
Figure 3:
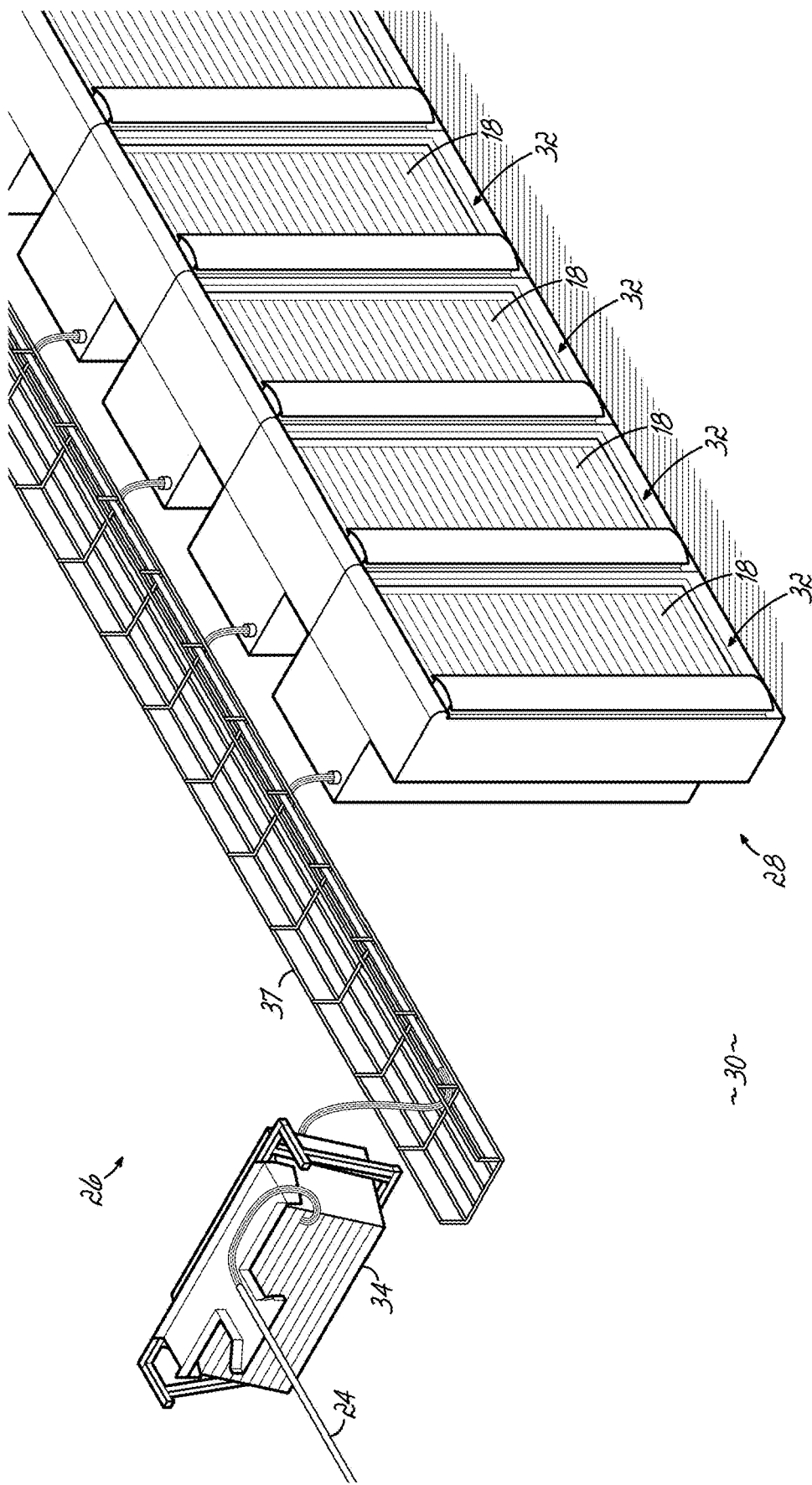

As illustrated in more detail in FIGS. 2 and 3, the network equipment 18 in the main building 12 or an auxiliary building 14 may be arranged in one or more data halls 26 that generally include a plurality of spaced-apart rows 28 on one or both sides of an access pathway 30. The arrangement of the data halls 26 into rows 28 helps organize the large number of equipment, fiber optic cables, fiber optic connections, etc. Each of the rows 28 includes a plurality of equipment racks or cabinets 32 (referred to hereafter as "equipment racks 32" or "racks 32") generally arranged one next to the other along the row 28. Each of the equipment racks 32 is a vertically arranged framework for holding various network equipment 18 of the data center 10, as is generally known in the telecommunications industry.

In one common arrangement, and as further illustrated in FIG. 2, each row 28 may include a main patch panel 34 at the head end of the row 28 closest to the access pathway 30. The main patch panel 34 represents a termination point of at least some of the optical fibers carried by one or more of the indoor cables 24, for example. Although the main patch panel 34 is shown as being positioned above the row 28, in other embodiments the main patch panel 34 may be in a cabinet (not shown) at the head end of the row 28 or in the first equipment rack 32 at the head end of the row 28. In yet other embodiments, the main patch panel 34 may be located within the associated row, such as in the middle of the row, and be above, below, or within one of the equipment racks 32. As discussed above, in a conventional arrangement, one or more distribution cables 36 (only a representative one is shown in FIGS. 2 and 3) are connected to the main patch panel 34 of a row 28 and routed along a cable tray 37 generally disposed above the row 28. The network equipment 18 in the equipment racks 32 is then optically connected to the one or more distribution cables 36 to provide the interconnectivity of the network equipment 18 of the data center 10.

Figure 4:
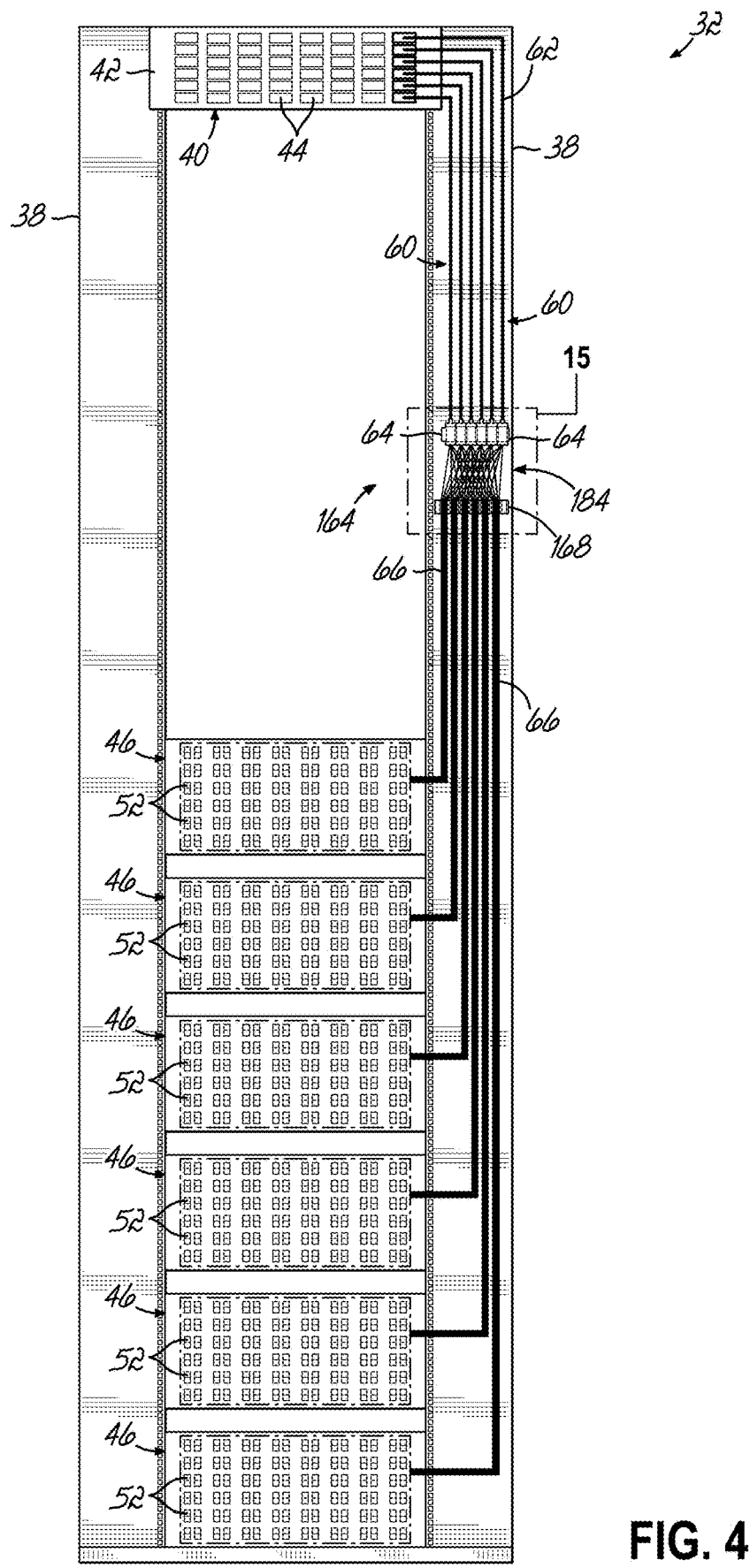
FIG. 4 is an equipment rack having cable harnesses installed therein according to an embodiment of the disclosure.

FIG. 4 illustrates an equipment rack 32 in accordance with an embodiment of the disclosure. The equipment rack 32 has a generally known construction and includes a plurality of vertical rails 38 that provide a framework for the equipment rack 32. In an exemplary embodiment, the equipment rack 32 includes a main rack patch panel 40 near a top of the equipment rack 32 that is configured to be connected to the one or more distribution cables 36 extending along the row 28 in the overhead cable trays 37. More particularly, the main rack patch panel 40 may include a rear interface (not shown) defining a plurality of connector interfaces or rear connector ports for making connections with the one or more distribution cables 36. The main rack patch panel 40 further includes a front interface 42 defining a plurality of front connector ports 44. Additionally, the equipment rack 32 typically includes a plurality of equipment patch panels 46 for receiving the network equipment 18 and securing the network equipment 18 to the vertical rails 38 of the equipment rack 32 (alternatively, the equipment patch panels 46 may be considered as part of an assembly that defines a piece of network equipment 18). In one embodiment, for example, the equipment rack 32 may include six equipment patch panels 46; however, the number may vary depending on the rack architecture. In one embodiment, the equipment patch panels 46 may be arranged below the main rack patch panel 40 in the equipment rack 32, but other arrangements may also be possible.

Figure 5:
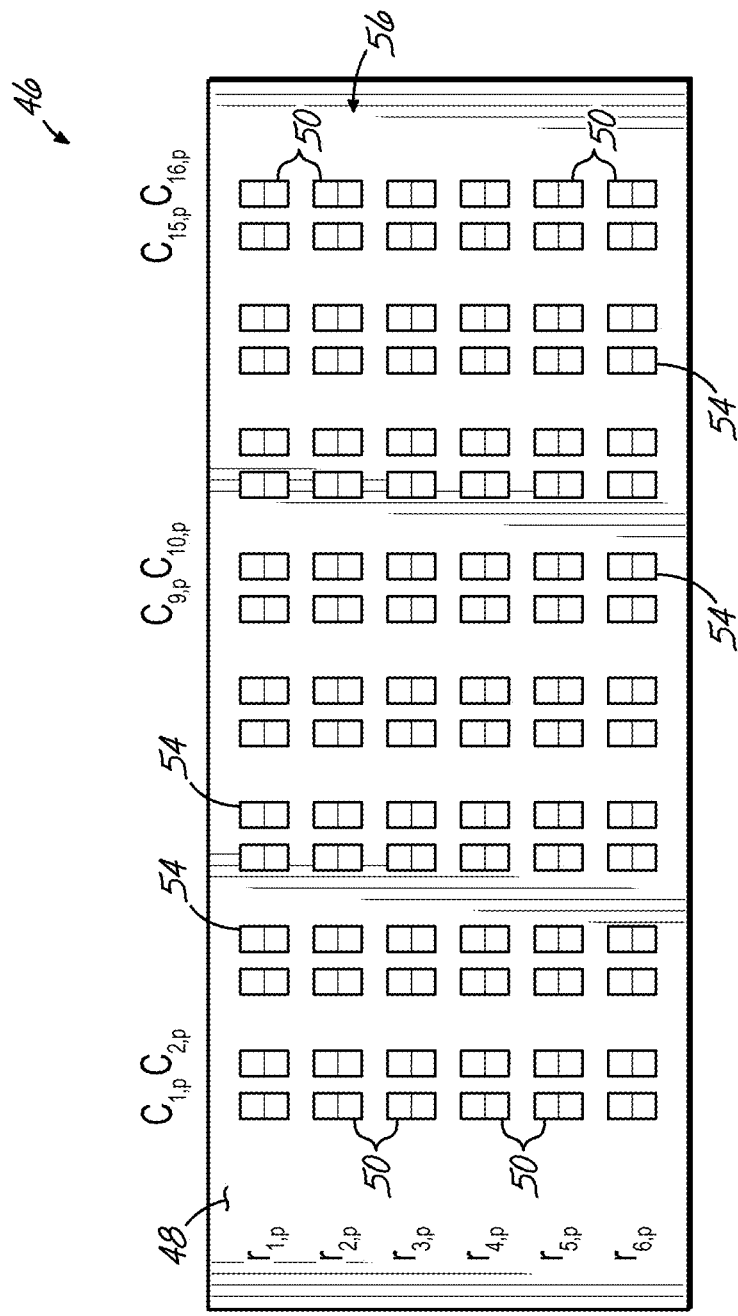
FIG. 5 is an exemplary equipment patch panel in the equipment rack shown in FIG. 4.

FIG. 5 schematically illustrates an exemplary equipment patch panel 46 in accordance with the disclosure. Each of the equipment patch panels 46 has a front interface 48 including a plurality of port locations 50. The plurality of port locations 50 is configured to receive connector ports 52 associated with the network equipment 18 connected to the equipment patch panel 46. In one embodiment, the plurality of port locations 50 in the front interface 48 may be defined by panel openings 54 (e.g., rectangular openings through the panel 46) that receive the connector ports 52 of the network equipment 18 therein. In an exemplary embodiment, the plurality of port locations 50 in the equipment patch panel 46 has a particular pattern or arrangement on the front interface 48 of the equipment patch panel 46. By way of example, and without limitation, the plurality of port locations 50 may be configured as a generally rectangular array 56 having a plurality of rows $r_{1,\,p}$, $r_{2,\,p}$, ... $r_{m,\,p}$ and a plurality of columns $c_{1,\,p}$, $c_{2,\,p}$, ... $c_{n,\,p}$, where m and n are the number of rows and columns in the array 56, respectively, and the p denotes that the port locations are on the equipment patch panel 46. In one embodiment, for example, each equipment patch panel 46 may include an array of port locations 50 with m=6 rows and n=16 columns, as illustrated in the figures (for a total of ninety-six port locations 50). However, it should be understood that the number of rows m and the number of columns n in the array 56 may be different from that above and selected for a particular application. It should be further understood that the pattern of port locations 50 on the equipment patch panels 46 may have configurations other than an array.

Figure 6:
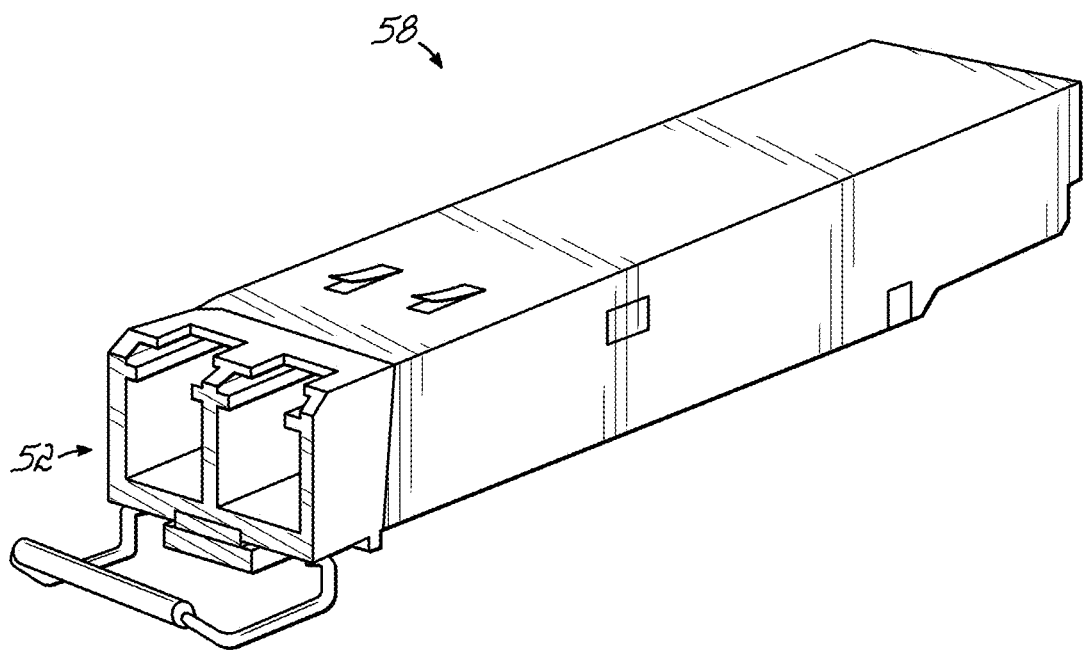
FIG. 6 is an exemplary piece of network equipment commonly connected to the equipment patch panel and having a connector port.

The network equipment 18 may be connected to the equipment patch panels 46 and include at least one connector port 52 configured to be received in respective panel openings 54 in each equipment patch panel 46. By way of example, and without limitation, FIG. 6 illustrates an exemplary transceiver 58 configured to be connected to the equipment patch panel 46 and includes a connector port 52 configured to be received in a panel opening 54 when the transceiver 58 is mounted to the equipment patch panel 46. Thus, the pattern or arrangement of the connector ports 52 of the network equipment 18 attached to an equipment patch panel 46 corresponds to the arrangement of the panel openings 54 in the equipment patch panel 46. As noted above, and as will be explained in more detail below, the plurality of connector ports 52 of the network equipment 18 is configured to be connected to respective connector ports 44 at the front interface 42 of the main rack patch panel 40 to thereby connect the network equipment 18 to the one or more row distribution cables 36.

To this end, the equipment rack 32 includes a plurality of rack cable assemblies 60 (referred to hereafter as "rack cable harnesses 60" or "cable harnesses 60") that connect the connector ports 52 in the equipment patch panels 46 to the main rack patch panel 40 near the top of the equipment rack 32. Aspects of the disclosure are directed to an optical interconnect system for installing the plurality of cable harnesses 60 into the equipment rack 32. More particularly, aspects of the disclosure are directed to an optical interconnect system that facilitates the connection of the plurality of cable harnesses 60 to the equipment patch panels 46 in a manner that minimizes the risk for patching errors, i.e., connecting connectors from the plurality of cable harnesses 60 to incorrect connector ports 52 on one or more of the equipment patent panels 50 in the equipment rack 32. Furthermore, aspects of the disclosure are also directed to cable management devices or furcation management devices for the optical interconnect system or the equipment rack 32 (described in detail below) that arrange the plurality of cable harnesses 60 between the main rack patch panel 40 and the equipment patch panels 46 in an organized manner.

Figure 7:
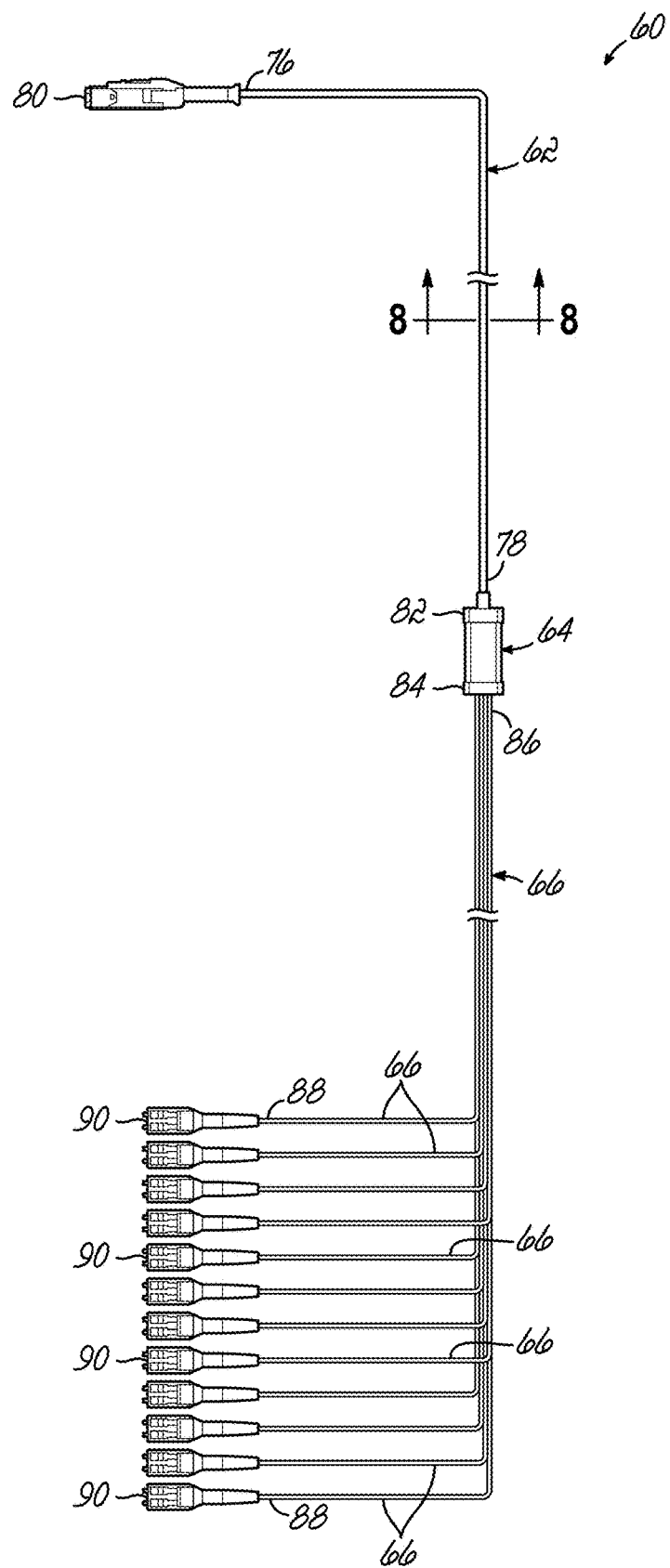
FIG. 7 is an exemplary cable harness configured to be mounted in the equipment rack of FIG. 4 according to an embodiment of the disclosure.

Before describing the optical interconnect system or the cable/furcation management devices, however, it may be instructive to first describe the configuration of an exemplary cable harness 60 configured to be used to connect the connector ports 52 of the network equipment 18 in the equipment patch panels 46 to the connector ports 44 in the main rack patch panel 40 near the top of the equipment rack 32. FIG. 7, for example, illustrates an exemplary cable harness 60 in accordance with the disclosure. The cable harness 60 generally includes a fiber optic cable 62, a furcation housing 64, and a plurality of breakout legs 66. The fiber optic cable 62 carries a plurality of optical fibers for passing data and other information through the local fiber optic network 16, and more specifically between the one or more distribution cables 36 of a row 28 and the network equipment 18 in an equipment rack 32 of the row 28. The number of optical fibers carried by the fiber optic cable 62 and how the optical fibers are arranged within the fiber optic cable 62 may vary based on the application.

Figure 8:
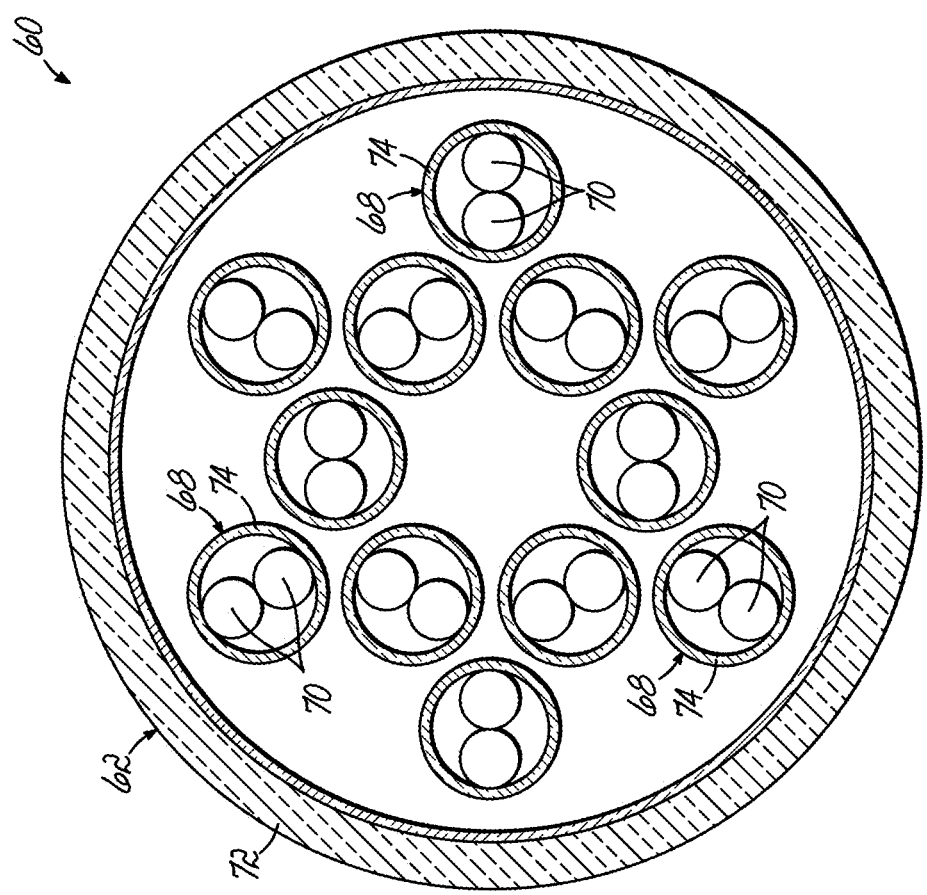
FIG. 8 is a cross-sectional view of the cable harness shown in FIG. 7.

FIG. 8 illustrates one exemplary embodiment of the fiber optic cable 62 in accordance with the disclosure. More particularly, the fiber optic cable 62 includes a plurality of subunits 68, and each subunit 68 is configured to carry a pre-selected number of optical fibers 70. Although the fiber optic cable 62 is shown as including twelve subunits 68, the number of subunits 68 may be more or less than this number in alternative embodiments. The plurality of subunits 68 may be arranged within an outer protective sheath 72 ("outer jacket 72"), as is generally known in the industry. As mentioned above, each of the subunits 68 is configured to carry a pre-selected number of optical fibers 70. By way of example and without limitation, in an exemplary embodiment, each subunit 68 may be configured to carry two optical fibers 70 within a subunit outer jacket 74. Thus, in one embodiment, the cable harness 60 may carry twenty-four optical fibers 70. It should be recognized, however, that more or less optical fibers 70 may be carried by each of the subunits 68 and the fiber optic cable 62 in alternative embodiments. Additionally, in other embodiments, the fiber optic cable 62 may carry the optical fibers 70 within the outer jacket 72 in a loose configuration such that there are no subunit outer jackets 74.

In reference to FIG. 7, the fiber optic cable 62 of the cable harness 60 includes a network end 76 and a furcation end 78 opposite the network end 76. The network end 76 of the fiber optic cable 62 includes at least one primary fiber optic connector 80 terminating the optical fibers 70 in the fiber optic cable 62. As will be explained in more detail below, the at least one primary fiber optic connector 80 is configured to be connected to a connector port 44 associated with the main rack patch panel 40 in the equipment rack 32 (which is, in turn, connected to the one or more distribution cables 36 extending along the row 28 in the cable tray 37). Any conventional, or yet to be developed, optical connector or connectorization scheme may be used in accordance with the present disclosure, including, but not limited to simplex or duplex connectors (e.g., LC connectors) and multi-fiber connectors (e.g., MPO connectors). For example, the at least one primary fiber optic connector 80 may include MPO (multi-fiber push on) connectors, which are configured for multi-fiber cables including multiple sub-units of optical fibers (e.g., between four to 24 optical fibers). In other embodiments, the at least one primary fiber optic connector 80 may be a different type of multi-fiber connector, such as an SN-MT connector commercially available from Senko Advanced Components, Inc. or an MMC connector commercially available from US Conec Ltd. In the exemplary embodiment shown in FIG. 7, the optical fibers 70 of the fiber optic cable 62 are terminated by one primary fiber optic connector 80, with that primary fiber optic connector 80 being configured as a 24-fiber MMC connector.

At the furcation end 78, the fiber optic cable 62 may extend into the furcation housing 64, where the outer jacket 72 of the fiber optic cable 62 is removed and the subunits 68 are broken or separated out into the plurality of breakout legs 66. As noted above, although the fiber optic cable 62 is shown as including twelve subunits 68, the number of subunits 68, and thus the number of breakout legs 66, may be more or less than this number in alternative embodiments. The furcation housing 64 includes a cable end 82 that receives the optical fibers 70 from the fiber optic cable 62 and a breakout end 84 from which the plurality of breakout legs 66 extend. Each of the plurality of breakout legs 66 includes a furcation end 86 received in the breakout end 84 of the furcation housing 64 and a rack end 88 opposite the furcation end 86. In some embodiments, the subunit outer-jackets 74 of the fiber optic cable 62 may extend beyond the outer jacket 72 within the furcation housing 64 and then exit the furcation housing 64 to function as outer jackets for the breakout legs 66. In other embodiments, such as those in which the optical fibers 70 are not contained in subunit outer jackets 74 within the fiber optic cable 62, the breakout legs 66 may include their own outer jackets or tubes for protecting the optical fibers 70. Such tubes or outer jackets may have ends within the furcation housing 64 for receiving the optical fibers 70 from the fiber optic cable 60 and then extend from the furcation housing 64 as portions of the breakout legs 66.

Still referring to FIG. 7, the rack end 88 of each of the plurality of breakout legs 66 includes at least one secondary fiber optic connector 90 terminating the optical fibers 70 in each of the breakout legs 66. As will be explained in more detail below, the at least one secondary fiber optic connector 90 is configured to be connected to a connector port 52 associated with the network equipment 18 in the equipment patch panels 46 in the equipment rack 32. Similar to the above, any conventional, or yet to be developed, optical connector or connectorization scheme may be used in accordance with the present disclosure, including, but not limited to simplex or duplex connectors (e.g., LC connectors) and multi-fiber connectors (e.g., MPO, MMC, or SN-MT connectors). For example, each of the breakout legs 66 may be terminated by a secondary fiber optic connector 90 configured as a duplex LC connector to correspond to the two optical fibers in each of the breakout legs 66 extending from the furcation housing 64. In other embodiments, the secondary fiber optic connectors 90 may be a different type of duplex connector, such as an SN connector commercially available from Senko Advanced Components, Inc. or an MDC connector commercially available from US Conec Ltd.

As the fiber optic industry evolves, the desire for more and more optical connections within a fixed space, such as an equipment rack 32, continues to increase. By way of example and without limitation, some data center architectures are requiring equipment racks 32 that can accommodate over 1,000 optical connections in a single rack. Based on the exemplary cable harnesses 60 described above, to achieve such a high number of optical connections, the equipment rack 32 must accommodate, for example, at least forty-eight cable harnesses 60. Forty-eight cable harnesses 60 collectively include 576 breakout legs 66 (twelve breakout legs 66 per cable harness 60) that are routed to the plurality of equipment patch panels 46 in the equipment rack 32. As one can appreciate, managing and organizing such a high number of breakout legs 66 within a single equipment rack 32 and executing the high number of optical connections for those breakout legs 66 without a patching error are a challenge.

Figure 9:
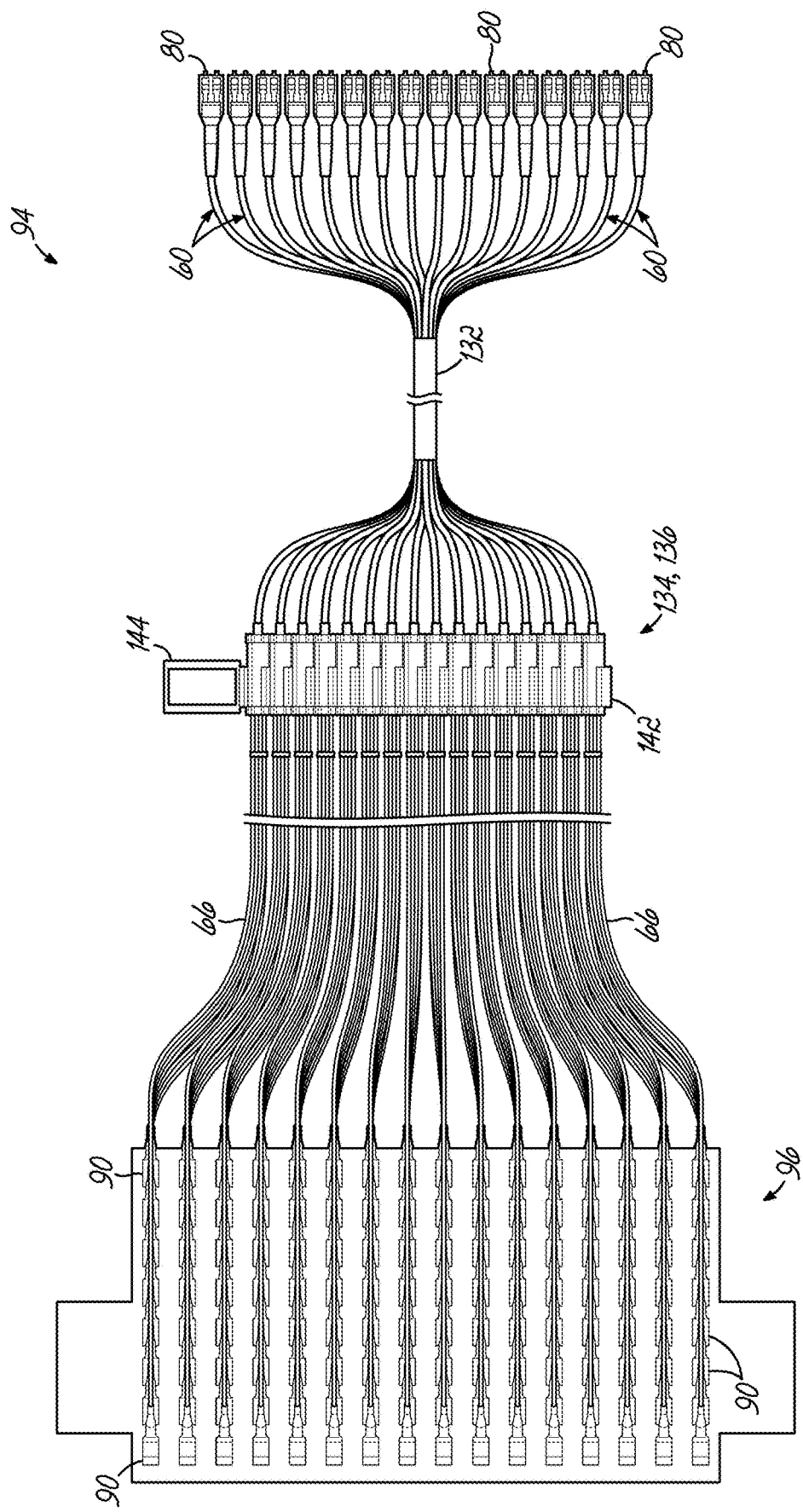
FIG. 9 is a plan view of an optical interconnect system in accordance with an embodiment of the disclosure.

As illustrated in FIG. 9, aspects of the disclosure are directed to an optical interconnect system 94 that aids in the installation of the plurality of cable harnesses 60 in the equipment rack 32. More particularly, the optical interconnect system 94 facilitates the connection of the breakout legs 66 of the plurality of cable harnesses 60 to their assigned connector ports 52 associated with the panel openings 54 in the plurality of equipment patch panels 46 according to the selected cable-routing scheme. In an exemplary embodiment, the optical interconnect system 94 includes a plurality of cable harnesses 60 (e.g., as described above) grouped or bunched together and at least one installation tray 96 to hold the plurality of secondary fiber optic connectors 90 terminating the plurality of breakout legs 66 of the group of cable harnesses 60 in the interconnect system 94.

The number of cable harnesses 60 and the number of installation trays 96 in the optical interconnect system 94 may vary depending on the particular application. In an exemplary embodiment, however, the number of installation trays 96 in the optical interconnect system 94 may correspond to the number of equipment patch panels 46 the group of cable harnesses 60 is configured to connect to. In this embodiment, for example, each installation tray 96 may be configured to hold the secondary fiber optic connectors 90 that connect to one (e.g., the same) equipment patch panel 46 in the equipment rack 32. Thus, the first installation tray 96 holds the secondary fiber optic connectors 90 that connect to the connector ports 52 associated with the first equipment patch panel 46 in the equipment rack 32; the second installation tray 96 holds the secondary fiber optic connectors 90 that connect to the connector ports 52 associated with the second equipment patch panel 46 in the equipment rack 32; and so forth. Having one installation tray 96 that corresponds to each equipment patch panel 46 in the equipment rack 32 provides an organized way to connect the secondary fiber optic connectors 90 of the cable harnesses 60 to their assigned connector ports 52 according to the selected cable-routing scheme. While it may be preferred that each installation tray 96 correspond to one equipment patch panel 46, aspects of the disclosure are not so limited. For example, in alternative embodiments, each installation tray 96 may correspond to more or less than one equipment patch panel 46 in the equipment rack 32.

In one embodiment, as illustrated in FIG. 9, for example, the optical interconnect system 94 may include one installation tray 96 that corresponds to one of the plurality of equipment patch panels 46 in the equipment rack 32. Thus, for an equipment rack 32 having six equipment patch panels 46, a technician would use six optical interconnect systems 94 to fully "wire" the equipment rack 32. This embodiment is merely exemplary, and it should be appreciated that the optical interconnect system 94 may include 2, 3, or more installation trays 96, each corresponding to a respective equipment patch panel 46 in the equipment rack 32. In one embodiment, for example, the number of installation trays 96 in the optical interconnect system 94 may correspond to the number of equipment patch panels 46 in the equipment rack 32 (e.g., six in the embodiment described above). In this case, a technician would need only one optical interconnect system 94 to fully "wire" the equipment rack 32. Accordingly, aspects of the disclosure should not be limited to any particular number of installation trays 96 in an optical interconnect system 94 or the number of optical interconnect systems 94 used to wire an equipment rack 32.

The number of cable harnesses 60 in the optical interconnect system 94 may depend on several factors, including the number of installation trays 96 in the optical interconnect system 94, the number of secondary fiber optic connectors 90 each equipment patch panel 46 is configured to receive, etc. The number of secondary fiber optic connectors 90 each equipment patch panel 46 is configured to receive may depend on the particular application, including the type of network equipment 18 associated with the equipment patch panel 46, and/or other factors. In one embodiment, for example, each equipment patch panel 46 may include ninety-six panel opening 54 that receive respective connector ports 52 from the network equipment 18 connected to the equipment patch panel 46. In the embodiment where the optical interconnect system 94 includes only one installation tray 96 (corresponding to one equipment patch panel 46), then the optical interconnect system 94 includes eight cable harnesses 60. As described above, each cable harness 60 includes one primary fiber optic connector 80, one furcation housing 64, twelve breakout legs 66, and twelve secondary fiber optic connectors 90 terminating respective breakout legs 66. Thus, as a whole, the optical interconnect system 94 includes eight cable harnesses 60 and therefore, eight primary fiber optic connectors 80 configured to be connected to respective connector ports 44 in the main rack patch panel 40; eight furcation housings 64; ninety-six breakout legs 66, and ninety-six secondary fiber optic connectors 90 configured to be connected to respective connector ports 52 in the selected equipment patch panel 46 in the equipment rack 32.

In an embodiment where optical interconnect system 94 includes two installation trays 96, then the optical interconnect system 94 includes sixteen cable harnesses 60; sixteen primary fiber optic connectors 80; sixteen furcation housings 64; 192 breakout legs 66; and 192 secondary fiber optic connectors 90. For a fully "wired" equipment rack 32 having six equipment patch panels 46 and a single optical interconnect system 94, the system 94 would include six installation trays 96, forty-eight cable harnesses 60, forty-eight primary fiber optic connectors 80, 576 breakout legs 66, and 576 secondary fiber optic connectors 90. From the above, it should be appreciated that the number of installation trays 96, cable harnesses 60, breakout legs 66, and secondary fiber optic connectors 90 may be varied to meet a particular application. In one embodiment, it may be preferred that one technician be able to "wire" the equipment rack 32. Thus, it may be preferred that each optical interconnect system 94 include no more than three installation trays 96 and corresponding cable harnesses 60. In an even more preferred embodiment, the optical interconnect system 94 may include one installation tray 96 corresponding to one equipment patch panel 46 in the equipment rack 32. Thus, for an equipment rack 32 having six equipment patch panels 46, the technician would use six optical interconnect systems 94 to fully wire the equipment rack 32. However, in this embodiment, each of the optical interconnect systems 94 may be easily handled by a single technician.

Figure 10:
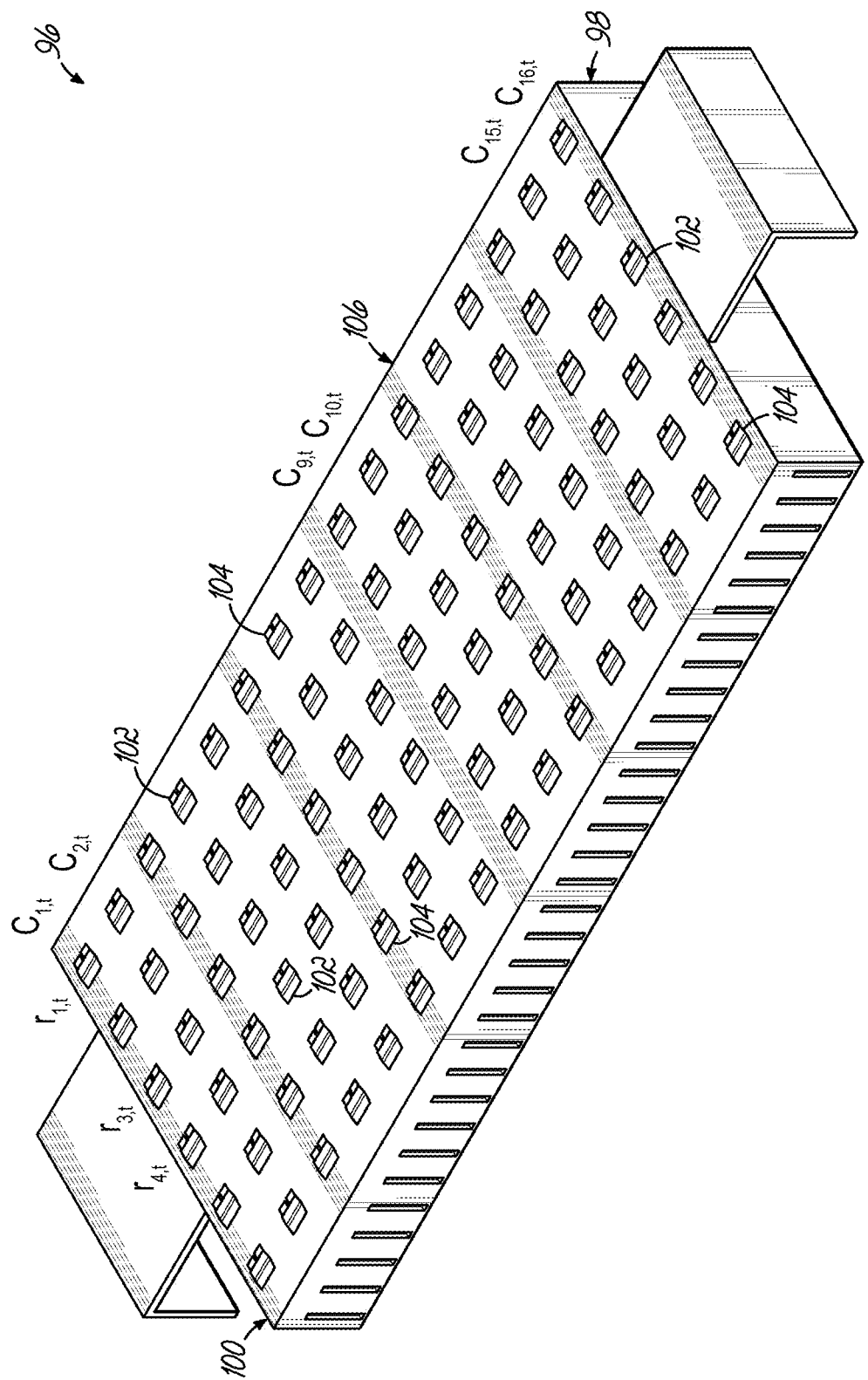
FIG. 10 is a perspective view of an installation tray of the optical interconnect system shown in FIG. 9 according to an embodiment of the disclosure.

As described above, the at least one installation tray 96 is configured to hold the secondary fiber optic connectors 90 of the plurality of cable harnesses 60 associated with the optical interconnect system 94. In one embodiment, and as illustrated in FIG. 10, the installation tray 96 may include a generally rectangular body 98 defining a connector-receiving surface or panel 100 (referred to hereafter as "connector panel 100") for receiving the secondary fiber optic connectors 90 from the plurality of cable harnesses 60 in the optical interconnect system 94. The connector panel 100 includes a plurality of coupling locations 102 configured to receive the secondary fiber optic connectors 90. In one embodiment, for example, the plurality of coupling locations 102 may be defined by respective recesses 104 in the connector panel 100. Each of the plurality of recesses 104 is configured to receive a respective secondary fiber optic connector 90 of the optical interconnect system 94 in, for example, a friction fit. Although the plurality of coupling locations 102 in the illustrated embodiment is shown as recesses 104, aspects of the disclosure are not so limited. In another embodiment, for example, the plurality of coupling locations 102 may be defined by clips or brackets that receive a respective secondary fiber optic connector 90 in a releasable or snap-fit manner. Thus, the plurality of coupling locations 102 may be defined by a wide range of elements configured to releasably secure the secondary fiber optic connectors 90 to the installation tray 96, and aspects of the disclosure should not be limited to the recesses 104 shown and described herein.

In one embodiment, the at least one installation tray 96 may be made from plastic, such as a wide range of recyclable engineering plastics, and through, for example, a molding process, such as an injection or blow molding process. Alternatively, the at least one installation tray 96 may be formed from sufficiently rigid and durable cardboard and/or other recyclable materials. Other materials and/or processes for forming the at least one installation tray 96 may also be possible and should not be limited to that described above.

The plurality of coupling locations 102 defined by respective recesses 104 may have a particular pattern or arrangement on the connector panel 100 of the at least one installation tray 96. More particularly, and in accordance with an aspect of the disclosure, the pattern of the coupling locations 102 on the connector panel 100 of the at least one installation tray 96 may be configured to match or correspond to the pattern of port locations 50 (as defined by panel openings 54, and thus connector ports 52) of the selected equipment patch panel 46 to which the secondary fiber optic connectors 90 of the optical interconnect system 94 are intended to connect. By way of example, and without limitation, in an exemplary embodiment, the plurality of coupling locations 102 may be configured as a generally rectangular array 106 having a plurality of rows $r_{1,\,t}, r_{2,\,t}, \ldots r_{m,\,t}$ and a plurality of columns $c_{1,\,t}, c_{2,\,t}, \ldots c_{n,\,t}$, where m and n are the number of rows and columns in the array 106, respectively, and the t denotes that the coupling locations are on the installation tray 96. In one embodiment, for example, the at least one installation tray 96 may include an array of coupling locations 102 with m=6 rows and n=16 columns, as illustrated in the figures (for a total of ninety-six coupling locations 102). However, it should be understood that the number of rows m and the number of columns n may be different from that above and selected for a particular application. It should be further understood that the pattern of coupling locations 102 on the at least one installation tray 96 may have configurations other than an array.

In any event, the pattern of coupling locations 102 on the connector panel 100 of the at least one installation tray 96 is configured to match the pattern of port locations 50 associated with the selected equipment patch panel 46 to which the secondary fiber optic connectors 90 of the cable harnesses 60 are being connected. Thus, the first column $c_{1,\,t}$ (or first row $r_{1,\,t}$) of the array 106 corresponds to the first column $c_{1,\,p}$ (or first row $r_{1,\,p}$) of the array 56; the second column $c_{2,\,t}$ (or second row $r_{2,\,t}$) of the array 106 corresponds to the second column $c_{2,\,p}$ (or second row $r_{2,\,p}$) of the array 56; and so on. As explained in more detail below, the correspondence in pattern between the plurality of coupling locations 102 on the installation tray 96 and the plurality of port locations 50 associated with a selected one of the plurality of equipment patch panels 46 facilitates the installation of the secondary fiber optic connectors 90 in the respective connector ports 52 associated with the selected equipment patch panel 46 so as to minimize patching errors.

Figure 11:
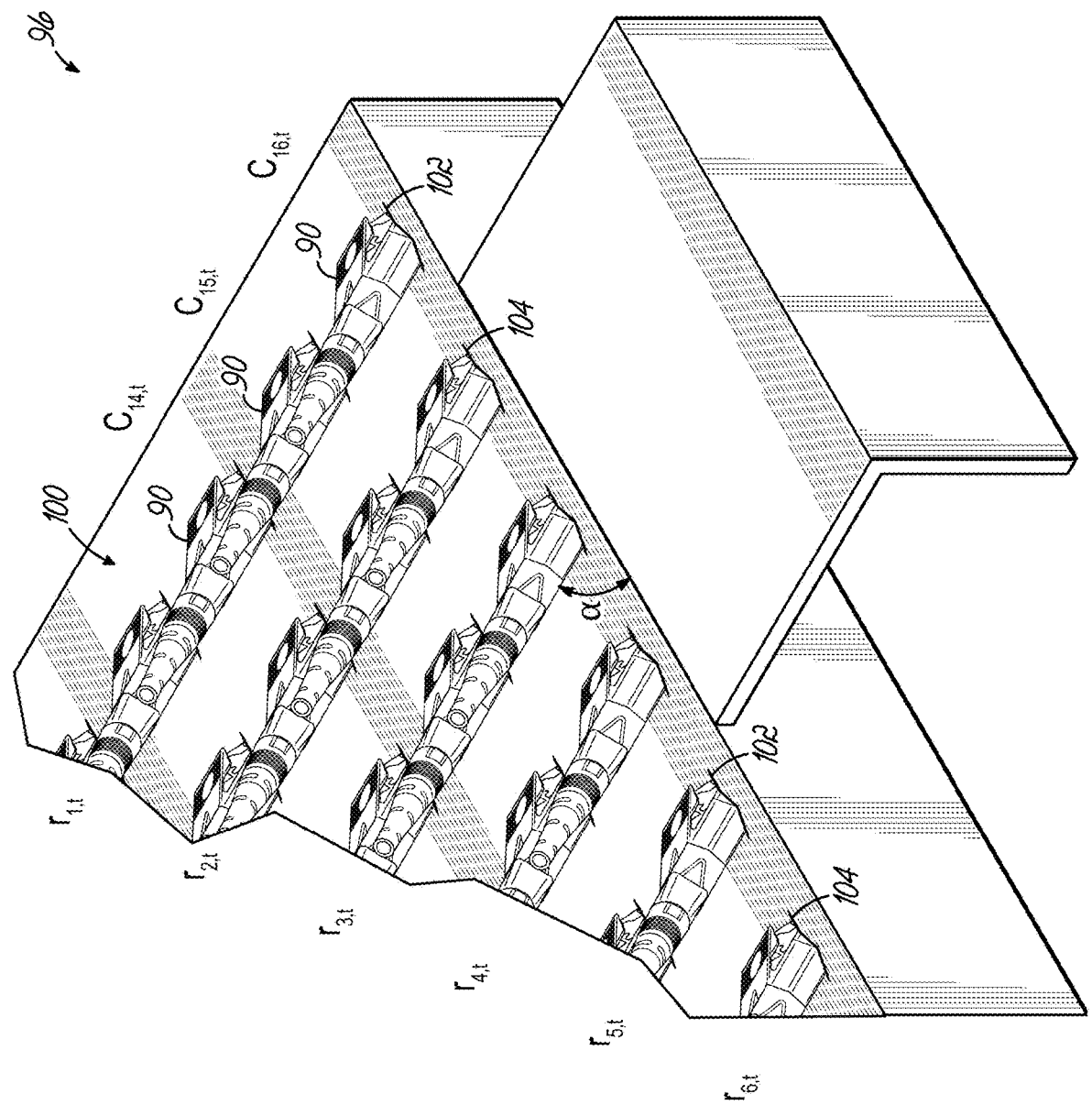
FIG. 11 is an enlarged partial perspective view of the installation tray of FIG. 10 having connectors from the cable harnesses connected thereto.

In one embodiment (not shown), the plurality of recesses 104 in the installation tray 96 may be configured so that the plurality of secondary fiber optic connectors 90 received in respective recesses 104 extend away from the connector panel 100 in a substantially orthogonal manner (e.g., +/−5°). In an alternative embodiment, however, and as illustrated in FIG. 11, the plurality of recesses 104 in the installation tray 96 may be configured so that the plurality of secondary fiber optic connectors 90 received in respective recesses 104 extend away from the connector panel 100 at an acute angle α relative to the connector panel 100. More particularly, the plurality of secondary fiber optic connectors 90 may extend from the connector panel 100 at an angle α between about thirty degrees and about sixty degrees, and preferably at about forty-five degrees. Angling the plurality of secondary fiber optic connectors 90 relative to the connector panel 100 of the installation tray 96 at a non-perpendicular angle aids the technician in better observing the pattern of the coupling locations 102 on the installation tray 96 relative to the pattern of the port locations 50 associated with the selected equipment patch panel 46 to which the secondary fiber optic connectors 90 are being connected, thereby further reducing the likelihood of a patching error.

Figure 12:
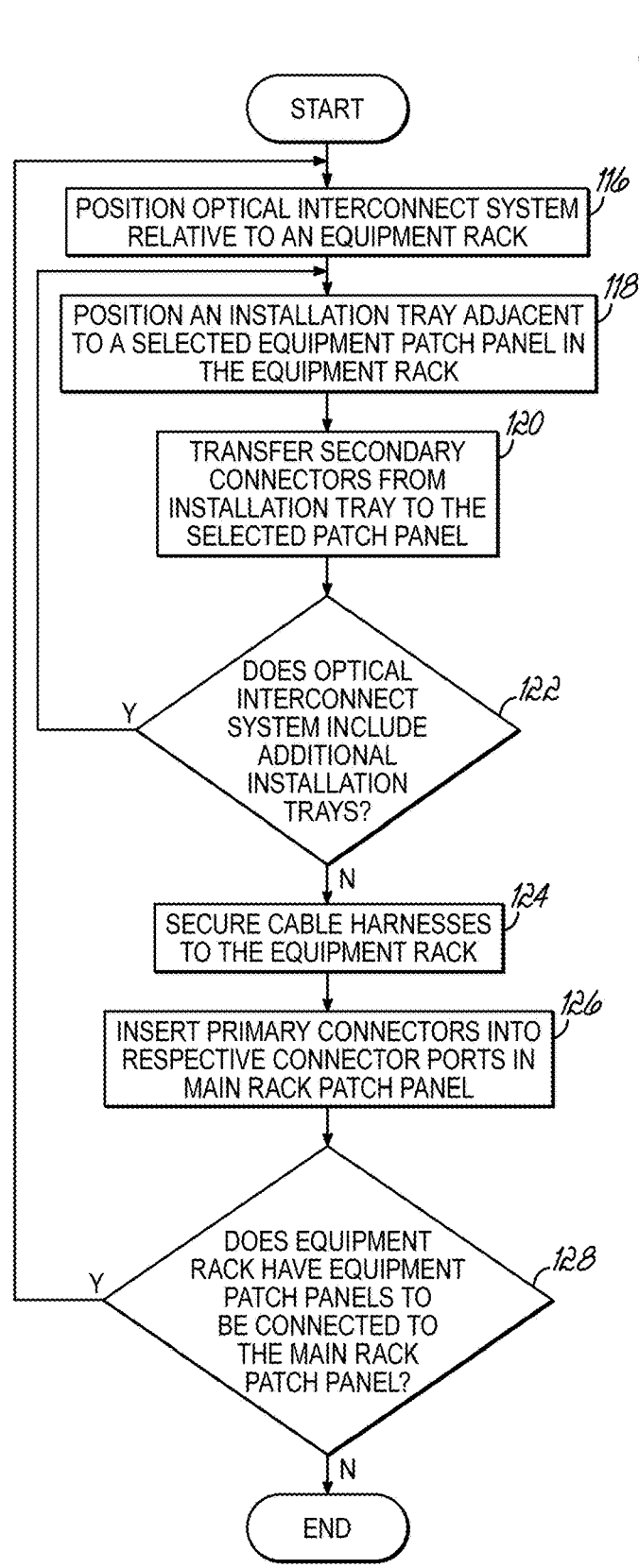
FIG. 12 is a flow chart of an exemplary method for installing cable harnesses into the equipment rack using the optical interconnect system according to an embodiment of the disclosure.

FIG. 12 provides a flow chart illustrating an exemplary method 114 of installing fiber optic cables in an equipment rack 32 utilizing one or more optical interconnect systems 94 according to an aspect of the disclosure. In one embodiment, the equipment rack 32 and the optical interconnect system 94 may be as that generally described above. In a first step 116, the method 114 may include positioning the optical interconnect system 94 relative to the equipment rack 32. For example, the optical interconnect system 94 may be connected or secured to the equipment rack 32 with one or more temporary or more permanent fasteners (e.g., Velcro straps, ties, etc.). When so positioned, the primary fiber optic connectors 80 from the plurality of cable harnesses 60 may be adjacent the main rack patch panel 40 positioned adjacent the top of the equipment rack 32, and the at least one installation tray 96 may be positioned adjacent a select one of the plurality of equipment patch panels 46 in the equipment rack 32. As will be explained in more detail below, in one embodiment, the optical interconnect system 94 may include a furcation management device, and this step may include connecting the furcation management device to the equipment rack to position the optical interconnect system 94 relative to the equipment rack 32. In an alternative embodiment, however, the furcation management device may be associated with the equipment rack 32 and this step may include connecting the furcation housings from the plurality of cable harnesses 60 to the furcation management device to position the optical interconnect system 94 relative to the equipment rack 32.

In a second step 118 of the exemplary method 114, the at least one installation tray 96 may be positioned relative to the selected equipment patch panel 46 such that the connector panel 100 of the at least one installation tray 96 faces toward and generally aligns with the selected equipment patch panel 46. In one embodiment, the installation tray 96 may be positioned immediately below the selected equipment patch panel 46 and oriented to extend away from the equipment patch panel 46 in a substantially perpendicular manner (e.g., +\−5°). Other positions may also be possible. In one embodiment, for example, the technician may simply hold the installation tray 96 in the position described above. In an alternative embodiment, however, the installation tray 96 may be temporarily connected to the equipment rack 32 so as to be immediately below the selected equipment patch panel 46 and extend therefrom in a substantially perpendicular manner. For example, the installation tray 96 may include mounting features that cooperate with standard rack features provided on an equipment rack 32 (FIG. 9). Those of ordinary skill in the art in the field of equipment rack connectivity will readily understand means for temporarily connecting the installation tray 96 to the equipment rack 32 and a further description will not be provided herein. This embodiment may be preferred as it frees up both hands of the technician for connecting the secondary fiber optic connectors 90 on the installation tray 96 to their assigned connector ports 52 associated with the selected equipment patch panel 46.

As noted above, with the installation tray 96 positioned relative to the select equipment patch panel 46, the technician will be able to readily identify that the pattern of the plurality of coupling locations 102 on the installation tray 96 matches or corresponds to the pattern of the plurality of port locations 50 on the selected equipment patch panel 46. Thus, in a third step 120 of the method 114, the technician may remove a secondary fiber optic connector 90 from the recess 104 at a particular coupling location on the installation tray 96 and insert the secondary fiber optic connector 90 in the connector port 52 at the corresponding port location 50 on the selected equipment patch panel 46.

For example, in one embodiment for arrays 106 and 56 in the installation tray 96 and the selected equipment patch panel 46, respectively, the secondary fiber optic connectors 90 may be removed from the installation tray 96 and inserted into the equipment patch panel 46 one at a time and in a column-by-column manner. More particularly, the secondary fiber optic connectors 90 in first column $c_{1,t}$ of array 106 on the installation tray 96 may be removed and inserted into the corresponding ports 52 in the first column $c_{1,p}$ of array 56 on the equipment patch panel 46 one at a time and starting at the top or bottom of the column; the secondary fiber optic connectors 90 in second column $c_{2,t}$ of array 106 on the installation tray 96 may be removed and inserted into the corresponding ports 52 in the second column $c_{2,p}$ of array 56 on the equipment patch panel 46 one at a time and starting at the top or bottom of the column; and so on until all of the secondary fiber optic connectors 90 have been transferred from the installation tray 96 to the selected equipment patch panel 46.

Alternatively, the secondary fiber optic connectors 90 may be removed from the installation tray 96 and inserted into the equipment patch panel 46 one at a time and in a row-by-row manner. More particularly, the secondary fiber optic connectors 90 in first row $r_{1,t}$ of array 106 on the installation tray 96 may be removed and inserted into the corresponding ports 52 in the first row $r_{1,p}$ of array 56 on the equipment patch panel 46 one at a time and starting from the left or the right of the row; the secondary fiber optic connectors 90 in second row $r_{2,t}$ of array 106 on the installation tray 96 may be removed and inserted into the corresponding ports 52 in the second row $r_{2,p}$ of array 56 on the equipment patch panel 46 one at a time and starting from the left or the right of the row; and so on until all of the secondary fiber optic connectors 90 have been transferred from the installation tray 96 to the selected equipment patch panel 46. While transferring the secondary fiber optic connectors 90 from the installation tray 96 to the selected patch panel 46 is described above as taking place in a column-by-column manner or a row-by-row manner, other transferring schemes may also be possible. However, the column-by-column or the row-by-row schemes may be preferred due to the ability of a technician to readily identify if a patching error has occurred by a visual inspection of the installation tray 96 and the selected equipment patch panel 46.

A fourth step 122 in the exemplary method 114 may include a decision block where it is determined if the optical interconnect system 94 includes any additional installation trays 96. If there are (the Y branch) additional installation trays 96, then the method 114 returns to step 118 to position another installation tray 96 relative to another selected equipment patch panel 46 in the equipment rack 32 and step 120 is repeated. For each of the installation trays 96, the pattern of the plurality of coupling locations 102 defined by recesses 104 and holding the secondary fiber optic connectors 90 from the cable harnesses 60 matches or corresponds to the pattern of the plurality of port locations 50 defined by the panel openings 54 (and the connector ports 52 from the network equipment 18 received therein). Thus, the technician may make the transition of the secondary fiber optic connectors 90 from the installation tray 96 to the selected patch panel 46 in the same manner as described above. This may be, for example, one at a time in a column-by-column manner, in a row-by-row manner, or some other predictable scheme that reduces the likelihood of patching errors.

If there are no further installation trays 96 in the optical interconnect system 94 (the N branch), then the exemplary method 114 moves to the fifth step 124 where the plurality of cable harnesses 60, such as the breakout legs 66 and/or the fiber optic cables 62 thereof, may be further secured to the equipment rack 32. For example, the breakout legs 66 of the plurality of cable harnesses 60 of the optical interconnect system 94 may be secured to standard cable management devices in the equipment rack with ties or straps, such as Velcro straps.

In a sixth step 126 of the exemplary method 114, to complete the installation of the cable harnesses 60 in the equipment rack 32, the plurality of primary fiber optic connectors 80 of the cable harnesses 60 may be inserted into respective front connector ports 44 on the front interface 42 of the main rack patch panel 40 near the top of the equipment rack 32 according to the cable routing scheme. In this way, the network equipment 18 in the selected equipment patch panels 46 may be connected to the desired in-row distribution cable(s) 36 extending down the row 28 in the cable tray 37, for example.

A seventh step 128 in the exemplary method 114 may include a decision block where it is determined whether other equipment patch panels 46 in the equipment rack 32 need to be connected to the main rack patch panel 40 by additional cable harnesses 60. If there are additional equipment patch panels 46 that require connection to the main rack patch panel 40 (the Y branch), then the method 114 may return to step 116 to install additional cable harnesses 60 using another optical interconnect system 94. In this regard, steps 118-126 may be repeated for each additional optical interconnect system 94 used to "wire" the equipment rack 32. If all of the equipment patch panels 46 in the equipment rack 32 are connected to the main rack patch panel 40 by cable harnesses 60 (the N branch), then the method 114 may end.

Due to the large number of breakout legs 66 from the plurality of cable harnesses 60 in the equipment rack 32, the at least one optical interconnect system 94 configured to be installed in the equipment rack 32 may include one or more cable management devices to organize the plurality of cable harnesses 60. By way of example, and without limitation, in one embodiment the at least one optical interconnect system 94 may include a cable management device in the form of a cover 132 (FIG. 9) configured to surround or enclose the plurality of cable harnesses 60 along at least a portion thereof in the at least one optical interconnect system 94. For example, the cover 132 may enclose the plurality of cable harnesses 60 of the optical interconnect system 94 along at least a portion of the length between the primary fiber optic connectors 80 and the furcation housings 64, i.e., along a portion of the length of the fiber optic cables 62 of the cable harnesses 60. The cover 132 keeps the "upstream" portion of the optical interconnect system 94 together and well organized. In one embodiment, the cover 132 may comprise a split mesh material or the like that groups the plurality of cable harnesses 60 together such that the proximal portion of the optical interconnect system 94 operates, for example, as a unit instead of separate cable portions, which can be unwieldy.

Figure 13:
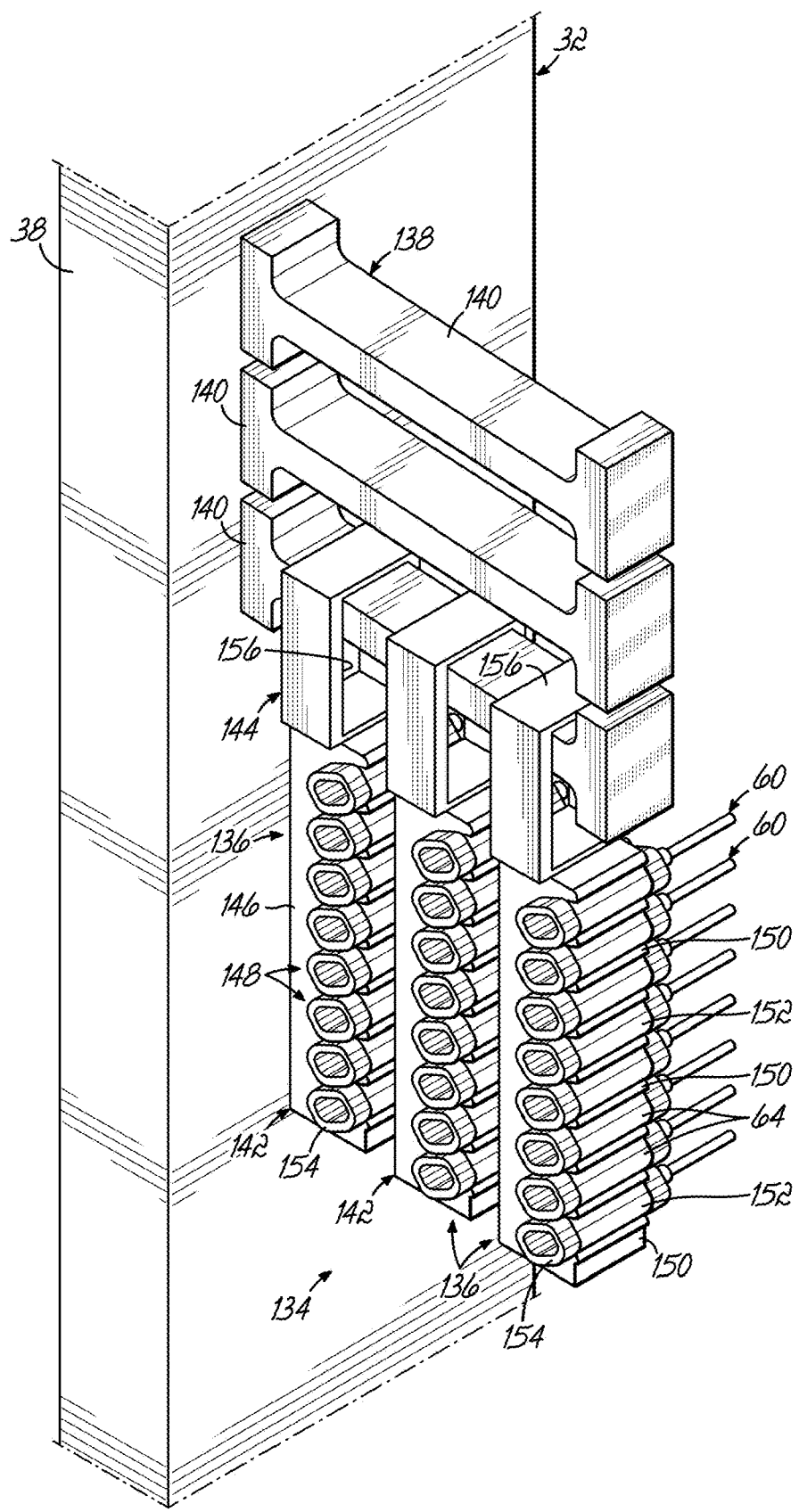
FIG. 13 is a perspective view of a furcation management device according to an embodiment of the disclosure connected to the equipment rack.

In another embodiment, the at least one optical interconnect system 94 may additionally or alternatively include a furcation management device 134 configured to hold, and thereby organize, the furcation housings 64 from the plurality of cable harnesses 60 in one or more optical interconnect systems 94. By way of example, and without limitation, the furcation management device 134 may include one or more furcation brackets 136 configured to be connected to the equipment rack 32 and also configured to hold a plurality of furcation housings 64 from a plurality of cable harnesses 60. FIG. 13 illustrates a plurality of exemplary furcation brackets 136 in accordance with an embodiment of the disclosure connected to the equipment rack 32. For example, the equipment rack 32 may include standard vertically arranged rack cable management elements 138 on one or both sides of the equipment rack 32. In one embodiment, the rack cable management elements 138 may include a plurality of vertically arranged support arms 140 attached to the vertical rails 38 or other structure of the equipment rack 32. Other types of rack cable management elements 138, however, may also be possible and known to those of ordinary skill in the fiber connectivity industry.

In one embodiment, the one or more furcation brackets 136 may be configured to connect to the cable management elements 138 at a location spaced from (e.g., above) the plurality of equipment patch panels 46 and adjacent to the main rack patch panel 40. For example, in one embodiment, the one or more furcation brackets 136 may connect to the equipment rack 32 somewhere between the main rack patch panel 40 and the plurality of equipment patch panels 46. It should be recognized, however, that the one or more furcation brackets 136 may be positioned at other locations of the equipment rack 32 and/or have alternative orientations relative to the equipment rack 32.

In the illustrated embodiment, the at least one furcation bracket 136 includes a main portion 142 for holding the plurality of furcation housings 64 associated with a plurality of cable harnesses 60 and a mounting portion 144 for connecting the furcation bracket 136 to the rack cable management elements 138 in the equipment rack 32. In an exemplary embodiment, the main portion 142 includes a generally rectangular elongate body 146 including a plurality of furcation bays 148 serially arranged along the length of the elongate body 146. In one embodiment, the elongate body 146 includes a plurality of tabs 150 extending from a face of the elongate body 146. Each of the furcation bays 148 of the furcation bracket 136 may be defined by an adjacent pair of tabs 150. A furcation housing 64 of a cable harness 60 is configured to be received in a respective bay 148 of the furcation bracket 136. The number of furcation bays 148 in the furcation bracket 136 may vary depending on the particular application. In one embodiment, for example, the number of bays 148 in the furcation bracket 136 may correspond to the number of cable harnesses 60 in the optical interconnect system 94. Thus, in one embodiment, the furcation bracket 136 may include eight furcation bays 148. In another embodiment, however, the number of furcation bays 148 may correspond to more than one optical interconnect system 94, such as two or three optical interconnect systems 94. In these embodiments, the furcation bracket 136 may include sixteen or twenty-four furcation bays 148. Thus, aspects of the disclosure should not be limited to the furcation bracket 136 having a particular number of furcation bays 148 or limited to only one optical interconnect system 94.

In one embodiment, the furcation housings 64 of the cable harnesses 60 may have a geometry configured to cooperate with the furcation bracket 136 to allow the furcation housings 64 to form a friction fit, snap fit, or other connection with the furcation bays 148 of the furcation bracket 136. In an exemplary embodiment, the furcation housings 64 may include a generally prismatic body with a cross section that is generally oval or rectangular. Other cross-sectional geometries may also be possible. A central region of the furcation housing 64 may include a necked down or recessed region 152 that forms at least one flange 154 and preferably a pair of flanges 154 at opposed ends of the furcation housing 64 (i.e., the furcation housing 64 is generally I-shaped). The recessed region 152 is configured to be received between the two adjacent tabs 150 on the furcation bracket 136 and the at least one flange 154 is configured to be to the side of the adjacent tabs 150. The spacing between the adjacent tabs 150 may be selected to be just smaller than a cross-dimension of the furcation housing 64 such that a friction fit or a snap fit is provided when the furcation housing 64 is inserted between the adjacent tabs 150.

In the illustrated embodiment, the mounting portion 144 may be arranged at one of the longitudinal ends of the elongate body 146. It should be understood, however, that the mounting portion 144 may be arranged at other locations of the elongate body 146, such as at a side thereof. In one embodiment, the mounting portion 144 may include a closed loop 156. The closed loop 156 may be sized such that the loop 156 may fit over an end of a support arm 140, for example. In this way, the furcation bracket 136 may hang down from or is suspended from one of the plurality of support arms 140 on the equipment rack 32. In one embodiment, the closed loop 156 may have a circular cross section, an oval cross section, a rectangular cross section, or other cross section.

In one embodiment (not shown), the plurality of tabs 150 projecting from the face of the elongate body 146 may extend from the face in a substantially perpendicular manner. In another embodiment, however, the plurality of tabs 150 may extend from the face so as to point or be directed toward the end of the longitudinal end of the furcation bracket 136 including the mounting portion 144. For example, when the furcation bracket 136 is suspended from a support arm 140 on the equipment rack 32, the plurality of tabs 150 may be angled in an upwardly direction (opposite to gravity). In this way, it becomes more difficult for the furcation housings 64 to become inadvertently dislodged from the furcation bracket 136. In one embodiment, the plurality of tabs 150 may form an angle with the face of the elongate body 146 (on the side above the tabs) between about forty-five degrees and about eighty degrees. Other angles may be possible as well.

In one embodiment, the furcation bracket 136 may be formed from a suitable engineering plastic or other polymer material through, for example, a molding process. The main portion 142 and the mounting portion 144 may be formed separately and then connected together, or alternatively, may be formed together as an integrated, monolithic body. In one embodiment, the furcation bracket 136 may be included as part of the optical interconnect system 94. This may allow, for example, the optical interconnect system 94 to be connected to the equipment rack 32 in a fairly easy and straight forward manner according to the exemplary method described above. More particularly, when initially connecting the optical interconnect system 94 to the equipment rack 32, the mounting portion 144 of the one or more furcation brackets 136 may be slid over one or more of the support arms 140 on the equipment rack 32 to support the cable harnesses 60 and allow the primary and secondary fiber optic connectors 80, 90 thereof to be connected to their assigned connector ports 44, 52 according to the cable-routing scheme. In another embodiment, the furcation management device 134, such as the furcation bracket 136, may not be part of the optical interconnect system 94 but instead be part of the equipment rack 32. In this embodiment, when the optical interconnect system 94 is positioned relative to the equipment rack 32, the furcation housings 64 from the plurality of cable harnesses 60 may be connected to the furcation bracket 136 that is part of the equipment rack 32.

Figure 14:
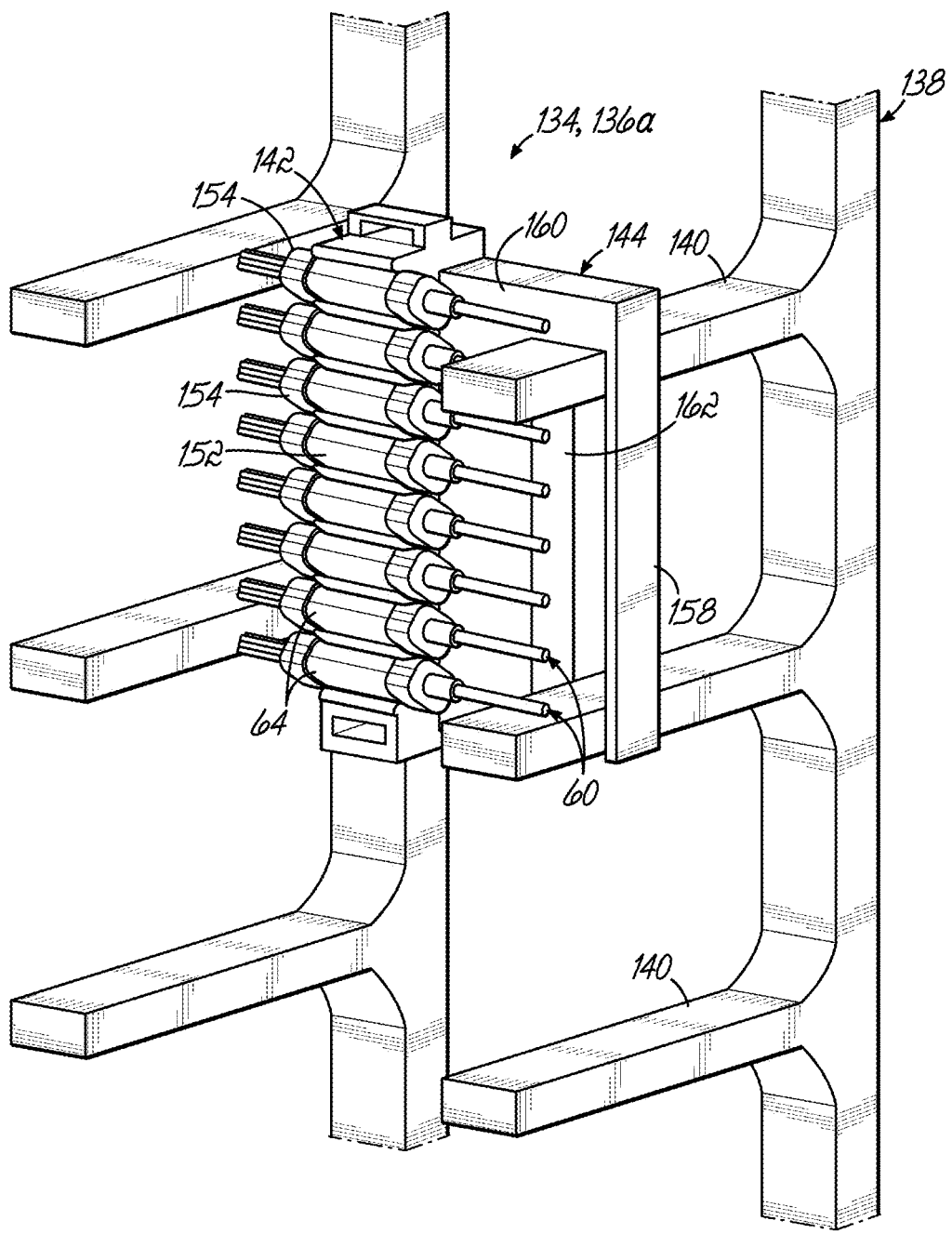
FIG. 14 is a perspective view of another furcation management device according to an embodiment of the disclosure connected to the equipment rack.

FIG. 14 illustrates a furcation management device 134 in the form of a furcation bracket 136a according to another embodiment of the disclosure. The furcation bracket 136a is similar to the furcation bracket 136 described above and only the differences will be described in detail. In reference to FIG. 14 the primary difference between the furcation bracket 136a and furcation bracket 136 is the configuration of the mounting portion 144. In this embodiment, the mounting portion 144 is not configured as a closed loop at a longitudinal end of the elongate body 146, like loop 156, but is instead configured as a hook arm 158 that hooks over at least one support arm 140, and preferably two vertically adjacent support arms 140 to prevent tilting or shifting. As illustrated in FIG. 14 in one embodiment, the hook arm 158 may be configured as a plate member 160 extending from a side of the elongate body 146. The plate member 160 includes a slot 162 sized to receive the at least one support arms 140 therein to thereby "hook" the furcation bracket 136a to the equipment rack 32. Similar to the above, the furcation bracket 136a may form part of the optical interconnect system 94. Alternatively, the furcation bracket 136a may be separate from the optical interconnect system 94 and attached to the equipment rack 32 when installing cable harnesses 60 using the at least one optical interconnect system 94 to wire the equipment rack 32.

Figure 15:
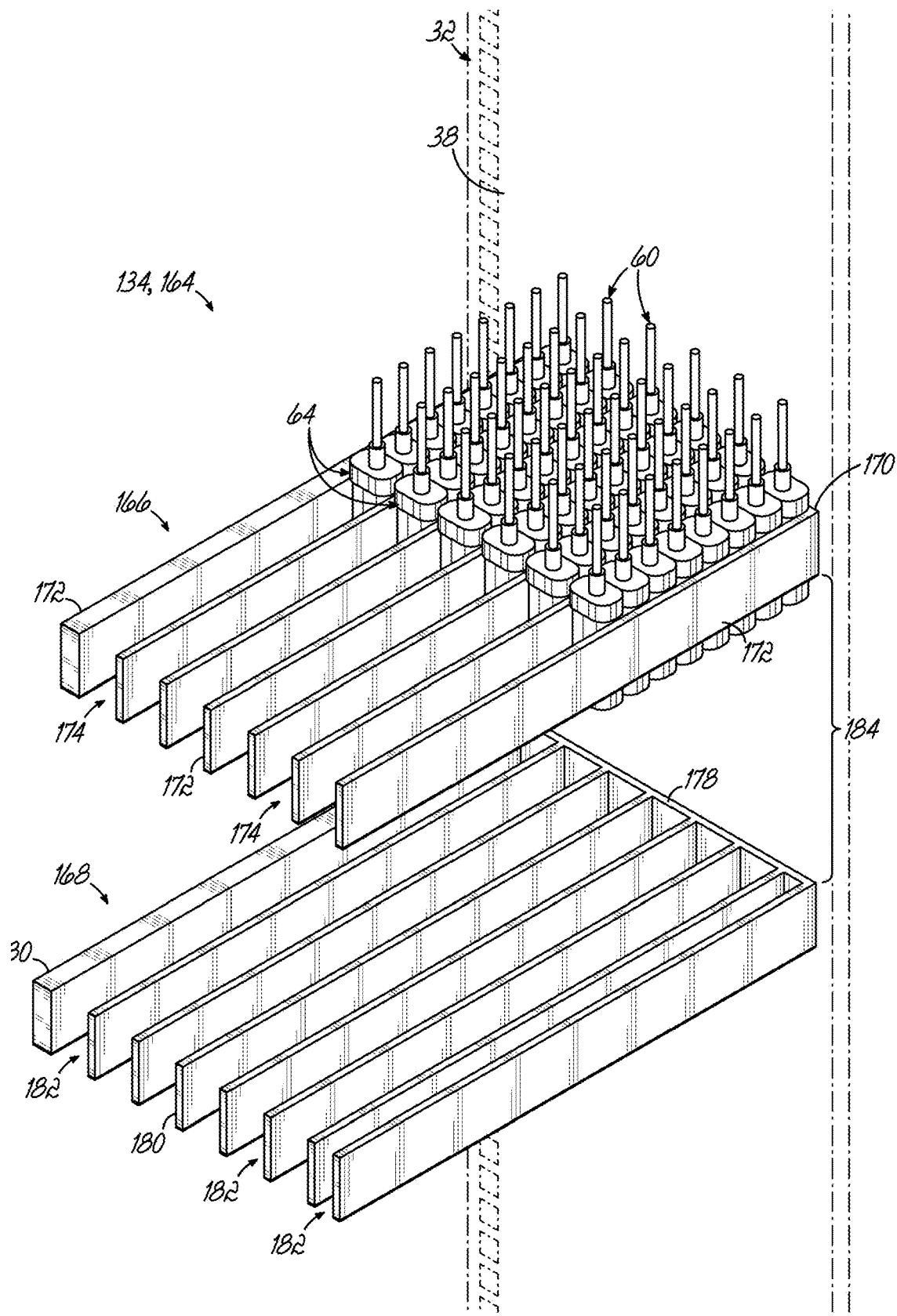
FIG. 15 is a perspective view of another furcation management device according to an embodiment of the disclosure connected to the equipment rack.

FIG. 15 illustrates a further embodiment of a furcation management device 134. In this embodiment, the furcation management device 134 includes a bracket system 164 having a furcation bracket 166 and a leg bracket 168 in a generally aligned but spaced-apart relationship from each other on the equipment rack 32. In one embodiment, the bracket system 164 may be vertically arranged in the equipment rack 32 with the furcation bracket 166 arranged generally vertically above the leg bracket 168. In an alternative embodiment (not shown), however, the bracket system 164 may be horizontally arranged with the furcation and leg brackets 166, 168 arranged in a generally side-by-side, spaced-apart manner. Additionally, while the bracket system 164 is illustrated by separate brackets 166, 168 individually mounted to the equipment rack 32, it should be appreciated that in an alternative embodiment, the furcation bracket 166 and leg bracket 168 may be part of an assembly (e.g., such as a housing or box) and/or be unitary in its structure that is mounted to the equipment rack 32 as a unit (as opposed to individual elements or pieces). Thus, it should be appreciated that the bracket system 164 may have different orientations and configurations within the equipment rack 32 and remain within the scope of the present disclosure.

The furcation bracket 166 includes a base wall 170 connected to one of the vertical rails 38 or other vertical structure of the equipment rack 32 (e.g., with mounting connectors, not shown) along which the cable harnesses 60 are configured to be routed. A plurality of elongate fingers 172 extends from the base wall 170 in a generally parallel, spaced-apart, and cantilevered fashion to define a plurality of elongate furcation slots 174 between adjacent pairs of elongate fingers 172. More particularly, each of the elongate fingers 172 includes a base end connected to the base wall 170 and a tip end spaced therefrom. The base wall 170 closes off the plurality of elongate furcation slots 174 at a base end of the furcation slots 174. However, the plurality of elongate furcation slots 174 remains open at a tip end of the furcation slots 174. Each of the plurality of elongate furcation slots 174 is configured to hold a plurality of furcation housings 64 associated with the plurality of cable harnesses 60 accommodated in the equipment rack 32.

In a similar manner, the leg bracket 168 includes a base wall 178 that connects to one of the vertical rails 38 or other vertical structure of the equipment rack 32 (e.g., with mounting connectors; not shown) along which the cable harnesses 60 are configured to be routed. A plurality of elongate fingers 180 extends from the base wall 178 in a generally parallel, spaced-apart, and cantilevered fashion to define a plurality of elongate leg slots 182 between adjacent pairs of elongate fingers 180. More particularly, each of the elongate fingers 180 includes a base end connected to the base wall 178 and a tip end spaced therefrom. The base wall 178 closes off the plurality of elongate leg slots 182 at a base end of the leg slots 182; however, the plurality of elongate leg slots 182 remains open at a tip end of the elongate leg slots 182. Each of the plurality of elongate leg slots 182 is configured to receive a plurality of breakout legs 66 associated with the plurality of cable harnesses 60 accommodated in the equipment rack 32.

As shown in FIG. 15 the furcation bracket 166 and leg bracket 168 may be mounted to the equipment rack 32 in spaced-apart relation to each other to define a meshing region 184 (FIG. 4). In the meshing region 184, the breakout legs 66 from the plurality of cable harnesses 60 (held by their respective furcation housings 64 in the furcation bracket 166) are "meshed" or distributed to one or more of the elongate leg slots 182 in the leg bracket 168 in accordance with a specific cable-routing scheme. In an alternative embodiment (not shown), the furcation management device 134 may include the furcation bracket 166 described above without the corresponding leg bracket 168 (i.e., the leg bracket 168 may be optional). In this alternative embodiment, the breakout legs 66 of the cable harnesses 60 may be organized in a different manner.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Thus, it should be evident that departures may be made from such details without departing from the scope of the disclosure.

What is claimed is:

1. An optical interconnect system for an equipment rack of a fiber optic network, the equipment rack including at least one equipment patch panel having a plurality of coupling port locations, the optical interconnect system comprising:
a plurality of cable harnesses configured for installation in the equipment rack, wherein each of the plurality of cable harnesses comprises:
a fiber optic cable carrying a plurality of optical fibers and having a network end and a furcation end, the network end including at least one primary fiber optic connector terminating the plurality of optical fibers and configured to be connected to the fiber optic network;
a furcation housing including a cable end and a breakout end, the cable end of the furcation housing receiving the furcation end of the fiber optic cable; and
a plurality of breakout legs having a furcation end and a rack end, wherein each of the plurality of breakout legs is configured to carry at least one optical fiber of the plurality of optical fibers, wherein the furcation end of each of the plurality of breakout legs is received in the breakout end of the furcation housing, and wherein the rack end of each of the plurality of breakout legs is terminated by at least one secondary fiber optic connector;
at least one installation tray including a plurality of coupling locations, wherein each of the plurality of secondary fiber optic connectors from the plurality of breakout legs is connected to the at least one installation tray at a respective coupling location of the plurality of coupling locations,
wherein the plurality of coupling locations on the at least one installation tray has an arrangement that corresponds to the plurality of port locations on the at least one equipment patch panel.

2. The optical interconnect system of claim 1, wherein the plurality of coupling locations on the at least one installation tray is arranged in a first pattern, wherein the plurality of port locations on the at least one equipment patch panel is arranged in a second pattern, and wherein the first pattern corresponds to the second pattern.

3. The optical interconnect system of claim 2, wherein the first pattern of the plurality of coupling locations defines a m×n array, and wherein the second pattern of the plurality of port locations defines an m×n array.

4. The optical interconnect system of claim 1, wherein the at least one installation tray includes a connector panel at which the plurality of secondary fiber optic cables is connected, wherein each of the plurality of coupling locations is defined by a recess in the connector panel, and wherein each of the plurality of secondary fiber optic connectors is received in a recess of the plurality of recesses in the at least one installation tray.

5. The optical interconnect system of claim 4, wherein each of the plurality of secondary fiber optic connectors project from its respective recess in the at least one installation tray at an acute angle relative to the connector panel of the installation tray, preferably between about thirty degrees and about sixty degrees, and even more preferably at about forty-five degrees.

6. The optical interconnect system of claim 1, further comprising a first cable management device including a cover for surrounding at least a portion of a length of the plurality of cable harnesses of the optical interconnect system, wherein the cover surrounds at least a portion of the length of the plurality of cable harnesses between the primary fiber optic connector and the furcation housing of each of the plurality of cable harnesses.

7. The optical interconnect system of claim 1, further comprising a furcation management device configured to be connected to the equipment rack.

8. The optical interconnect system of claim 7, wherein the furcation management device includes at least one furcation bracket holding a plurality of furcation housings from the plurality of cable harnesses.

9. The optical interconnect system of claim 8, wherein the at least one furcation bracket comprises:
a main portion defining a plurality of furcation bays, each of the furcation bays having a furcation housing of the plurality of furcation housings positioned therein; and
a mounting portion for connecting the at least one furcation bracket to the equipment rack.

10. The optical interconnect system of claim 9, wherein the main portion comprises:
an elongate body defining a tab surface; and
a plurality of tabs extending from the tab surface of the elongate body,
wherein each of the plurality of furcation bays is formed by an adjacent pair of the plurality of tabs.

11. The optical interconnect system of claim 10, wherein each of the plurality of tabs extending from the elongate body forms an acute angle relative to the tab surface.

12. The optical interconnect system of claim 9, wherein the mounting portion includes a closed loop or a hook arm.

13. The optical interconnect system of claim 1, further comprising a bracket system, the bracket system including a furcation bracket having a plurality of elongate furcation slots and receiving a plurality of furcation housings therein, the furcation bracket further comprising:
a base wall; and
a plurality of elongate fingers extending from the base wall,
wherein each of the plurality of elongate furcation slots is formed by an adjacent pair of the plurality of elongate fingers.

14. The optical interconnect system of claim 13, wherein the bracket system further comprises a leg bracket having a plurality of leg slots for receiving a plurality of breakout legs, the leg bracket comprising:
a base wall; and
a plurality of elongate fingers extending from the base wall,
wherein each of the plurality of elongate leg slots is formed by an adjacent pair of the plurality of elongate fingers.

15. A method of installing a plurality of cable harness in an equipment rack of a fiber optic network, the equipment rack including a plurality of equipment patch panels, each equipment patch panel including a plurality of coupling locations defined by connector ports, the method comprising:
i) providing at least one optical interconnect system that includes plurality of cable harnesses configured for installation in the equipment rack and at least one installation tray that includes a plurality of coupling locations, wherein each of the plurality of cable harnesses comprises:
- a fiber optic cable carrying a plurality of optical fibers and having a network end and a furcation end, the network end including at least one primary fiber optic connector terminating the plurality of optical fibers and configured to be connected to the fiber optic network;
- a furcation housing including a cable end and a breakout end, the cable end of the furcation housing receiving the furcation end of the fiber optic cable; and
- a plurality of breakout legs having a furcation end and a rack end, wherein each of the plurality of breakout legs is configured to carry at least one optical fiber of the plurality of optical fibers, wherein the furcation end of each of the plurality of breakout legs is received in the breakout end of the furcation housing, and wherein the rack end of each of the plurality of breakout legs is terminated by at least one secondary fiber optic connector, and wherein each of the plurality of secondary fiber optic connectors from the plurality of breakout legs is connected to the at least one installation tray at a respective coupling location of the plurality of coupling locations, and wherein the plurality of coupling locations on the at least one installation tray has an arrangement that corresponds to the plurality of port locations on the at least one equipment patch panel;

ii) positioning the plurality of cable harnesses of the at least one optical interconnect system relative to the equipment rack;

iii) positioning the at least one installation tray of the at least one optical interconnect system relative to a selected one of the plurality of equipment patch panels in the equipment rack; and iv) transferring each of the plurality of secondary fiber optic connectors from the at least one installation tray to a connector port of the plurality of connector ports associated with the selected one of the plurality of equipment patch panels.

16. The method of claim 15, wherein positioning the plurality of cable harnesses relative to the equipment rack includes connecting the plurality of cable harnesses to the equipment rack so that the primary fiber optic connectors from the plurality of cable harnesses are adjacent a main rack patch panel in the equipment rack and the at least one installation tray is adjacent the selected one of the plurality of equipment patch panels.

17. The method of claim 15, wherein positioning the at least one installation tray includes temporarily connecting the at least one installation tray to the equipment rack and positioning the at least one installation tray below the selected one of the plurality of equipment patch panels so as to extend away from the selected one of the plurality of equipment patch panels.

18. The method of claim 15, wherein the at least one optical interconnect system includes additional installation trays, and wherein the method includes repeating steps ii)-iv) for each of the plurality of installation trays at a respective one of the remaining plurality of equipment patch panels in the equipment rack.

19. An equipment rack of a fiber optic network, comprising:
- a plurality of equipment patch panels mounted in the equipment rack, wherein each of the plurality of equipment patch panels includes a plurality of connector ports;
- a plurality of cable harnesses arranged in the equipment rack, wherein each of the plurality of cable harnesses comprises:
  - a fiber optic cable carrying a plurality of optical fibers and having a network end and a furcation end, the network end including at least one primary fiber optic connector terminating the plurality of optical fibers and configured to be connected to the fiber optic network;
  - a furcation housing including a cable end and a breakout end, the cable end of the furcation housing receiving the furcation end of the fiber optic cable;
  - a plurality of breakout legs having a furcation end and a rack end, wherein each of the plurality of breakout legs is configured to carry at least one optical fiber of the plurality of optical fibers, wherein the furcation end of each of the plurality of breakout legs is received in the breakout end of the furcation housing, wherein the rack end of each of the plurality of breakout legs is terminated by at least one secondary fiber optic connector, and wherein the plurality of secondary fiber optic connectors from the plurality of breakout legs is connected to connector ports in the plurality of equipment patch panels mounted in the equipment rack; and
- at least one furcation management device mounted to the equipment rack and holding the furcation housings from the plurality of cable harnesses.

20. The equipment rack of claim 19, wherein the at least one furcation management device includes at least one furcation bracket holding a plurality of furcation housings from the plurality of cable harnesses.

* * * * *